United States Patent
Malboubi et al.

(10) Patent No.: US 10,656,960 B2
(45) Date of Patent: May 19, 2020

(54) FLOW MANAGEMENT AND FLOW MODELING IN NETWORK CLOUDS

(71) Applicant: AT&T INTELLECTUAL PROPERTY I, L.P., Atlanta, GA (US)

(72) Inventors: Mehdi Malboubi, San Ramon, CA (US); Baofeng Jiang, Pleasanton, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 131 days.

(21) Appl. No.: 15/829,806

(22) Filed: Dec. 1, 2017

(65) Prior Publication Data

US 2019/0171474 A1 Jun. 6, 2019

(51) Int. Cl.
G06F 9/455 (2018.01)
H04L 29/12 (2006.01)

(52) U.S. Cl.
CPC ...... *G06F 9/45558* (2013.01); *H04L 61/2007* (2013.01); *H04L 61/2038* (2013.01);
(Continued)

(58) Field of Classification Search
None
See application file for complete search history.

(56) References Cited

U.S. PATENT DOCUMENTS 6,909,693 B1 6/2005 Firoiu et al.
7,584,276 B2 9/2009 Chafle et al.
(Continued)

FOREIGN PATENT DOCUMENTS

WO 2006130840 A2 12/2006
WO 2015154483 A1 10/2015
(Continued)

OTHER PUBLICATIONS

Huang, Danny Yuxing, et al., "High-fidelity switch models for software-defined network emulation", Proceedings of the second ACM SIGCOMM workshop on Hot topics in software defined networking, ACM, 2013, [http://www.s ysnet.ucsd.edu/~dhuang/static/hotsdn-13-cr.pdf].

(Continued)

*Primary Examiner* — Kenneth Tang
(74) *Attorney, Agent, or Firm* — Amin, Turocy & Watson, LLP

(57) ABSTRACT

Assignment of network addresses and estimations of flow sizes associated with network nodes can be enhanced. Assignment management component (AMC) partitions a set of network addresses into subsets of network addresses associated with respective classes. For respective virtual machines (VMs), an estimator component estimates a flow size associated with a VM based on parameters associated with the VM. AMC classifies VMs based on threshold flow-size values and respective estimated flow sizes of VMs, and assigns VMs to respective sub-groups of VMs associated with respective subsets of network addresses based on respective classifications of VMs. AMC assigns an available network address of a subset of network addresses associated with a class to a VM of a sub-group associated with that class. Estimated flow sizes and performance metrics also are utilized to make determinations regarding VM placement, traffic management, load balancing, resource allocation, and orchestration in cloud networks.

20 Claims, 8 Drawing Sheets

(52) U.S. Cl.
CPC .. *H04L 61/2061* (2013.01); *G06F 2009/4557* (2013.01); *G06F 2009/45591* (2013.01); *G06F 2009/45595* (2013.01); *H04L 61/6004* (2013.01); *H04L 61/6022* (2013.01)

(56) References Cited

U.S. PATENT DOCUMENTS

| | | | |
|---|---|---|---|
| 7,684,320 | B1 | 3/2010 | Nucci |
| 8,737,204 | B2 | 5/2014 | Szabo et al. |
| 8,817,655 | B2 | 8/2014 | Szabo et al. |
| 8,964,752 | B2 | 2/2015 | Zhang et al. |
| 9,584,371 | B2 | 2/2017 | Zhang et al. |
| 9,692,706 | B2 | 6/2017 | Basso et al. |
| 9,705,800 | B2 | 7/2017 | Sankar et al. |
| 9,762,471 | B2 | 9/2017 | Vicat-Blanc et al. |
| 2006/0239219 | A1 | 10/2006 | Haffner et al. |
| 2012/0020216 | A1 | 1/2012 | Vashist et al. |
| 2012/0147891 | A1* | 6/2012 | Heo ............ H04L 47/125 370/392 |
| 2014/0075557 | A1 | 3/2014 | Balabine et al. |
| 2014/0105215 | A1 | 4/2014 | Mogul et al. |
| 2014/0215077 | A1 | 7/2014 | Soudan et al. |
| 2014/0334304 | A1* | 11/2014 | Zang ............ H04L 47/2441 370/235 |
| 2016/0057061 | A1 | 2/2016 | Avci et al. |
| 2016/0218951 | A1* | 7/2016 | Vasseur ............ H04L 43/12 |
| 2016/0261507 | A1 | 9/2016 | Kwak et al. |
| 2016/0269355 | A1* | 9/2016 | Lee ............ H04W 8/26 |
| 2016/0359890 | A1* | 12/2016 | Deen ............ H04L 63/1425 |
| 2017/0118100 | A1 | 4/2017 | Xu et al. |
| 2017/0195253 | A1 | 7/2017 | Annaluru et al. |
| 2018/0278506 | A1* | 9/2018 | Bifulco ............ H04L 43/0864 |

FOREIGN PATENT DOCUMENTS

| | | |
|---|---|---|
| WO | 2016137371 A1 | 9/2016 |
| WO | 2017058188 A1 | 4/2017 |

OTHER PUBLICATIONS

Hu, Fei, et al., "A survey on software-defined network and openflow: From concept to implementation", IEEE Communication Surveys & Tutorials, vol. 16, No. 4, Fourth Quarter 2014, 2181-2206. [https://pdfs.semanticscholar.org/6292/0d0511da12988322403e1f6a98fa3c95aae4.pdf].

Akyildiz, Ian, F., et al. "A roadmap for traffic engineering in SDN-OpenFlow networks", Computer Networks, Jun. 2014, 71:1-30 [http://sdncentral.ir/wp-content/uploads/2015/11/A_roadmap_for_traffic_engineering_in_SDNOpenFlow_networks.pdf].

Roughan, Matthew, et al., "Spatio-Temporal Compressive Sensing and Internet Traffic Matrices (Extended Version)", ACM Sigcomm 2009.

"NetFlow", [https://en.wikipedia.org/wiki/NetFlow], Last accessed on Jan. 22, 2018.

"Sflow", [http://www.sflow.org/], Last accessed on Jan. 22, 2018.

Medina, A., et al., "Traffic Matrix Estimation: Existing Techniques and New Directions", In Proc. of ACM-SIGCOMM, 2002.

Zhao, Q., et al., "Robust traffic matrix estimation with imperfect information: Making use of multiple data sources", In Proc. of ACM-SIGMETRICS, 2006.

Nucci, Antonio, et al., "Design, Measurement and Management of Large-Scale IP Networks", Cambridge University Press, 2009. 11 pages.

Malboubi, Mehdi, et al., "Intelligent SDN based traffic (de)Aggregation and Measurement Paradigm (iSTAMP)", IEEE INFOCOM, Apr./May 2014.

* cited by examiner

FLOW MANAGEMENT AND FLOW MODELING IN NETWORK CLOUDS

TECHNICAL FIELD

This disclosure relates generally to communications, e.g., to flow management and flow modeling in network clouds.

BACKGROUND

In networking, a flow can be defined as a sequence of packets sharing common network identification attributes, which can be extracted from packet header fields associated with the packets. The size (e.g., volume) of a flow (e.g., origin-destination flow (ODF)) can be defined as the number of packets or bytes of a flow over a particular period of time. For many networking applications, knowledge of flow sizes with regard to traffic being communicated in the network can be desirable for a number of reasons. For instance, flow size measurement and estimation can be desirable in network monitoring, which can provide desired (e.g., useful) information for different applications, including network design, operation and management of the network, and/or security of the network.

The above-described description is merely intended to provide a contextual overview relating to network communications, and is not intended to be exhaustive.

DETAILED DESCRIPTION

Figure 1:
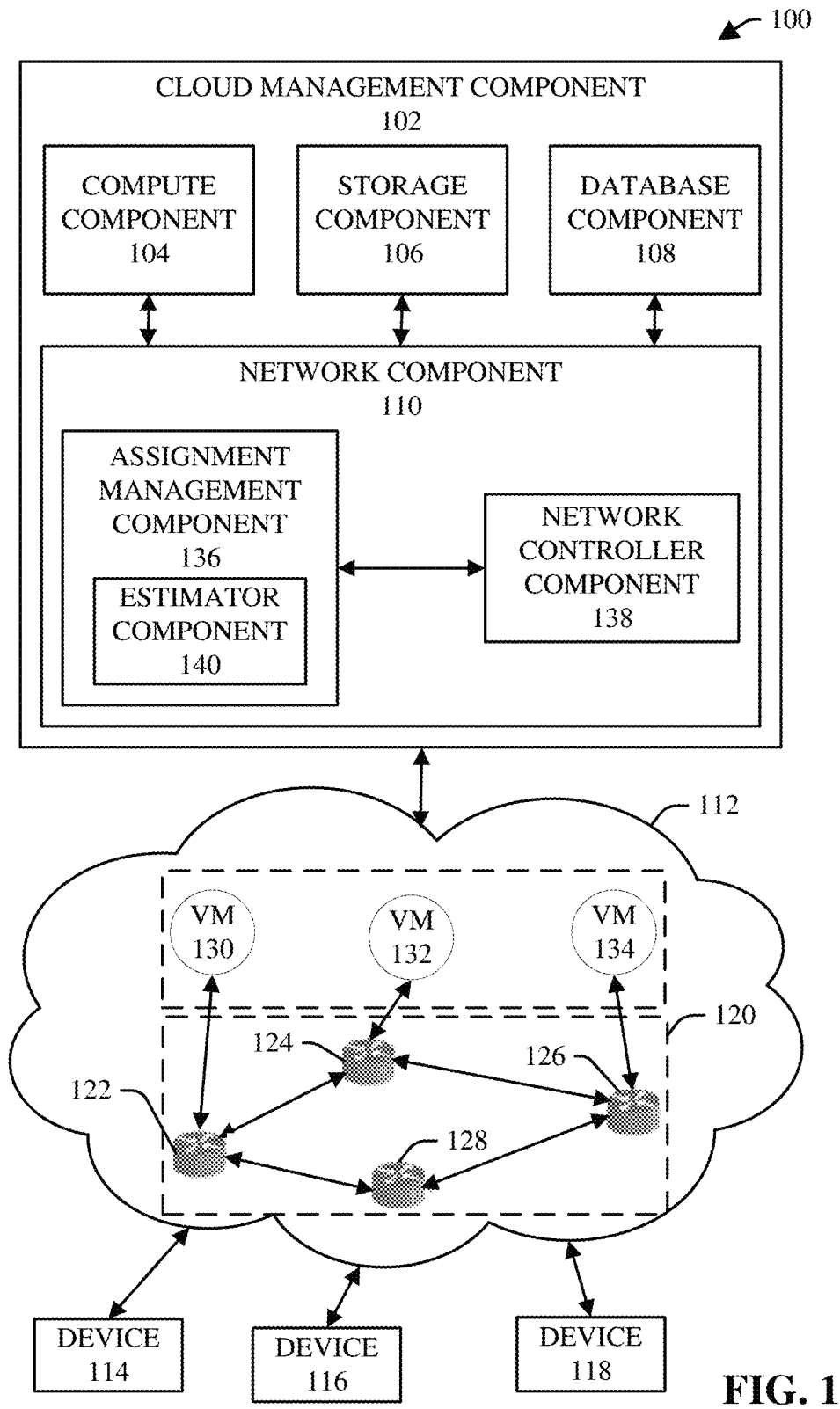
FIG. 1 illustrates a block diagram of an example system that can enhance network address assignments and flow-size estimations or determinations associated with nodes in a network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In networking, a flow can be defined as a sequence of packets sharing common network identification attributes that can be extracted from packet header fields. The size (e.g., volume) of a flow (e.g., an origin-destination flow (ODF)) also can be defined as the number of packets or bytes of a flow over a particular period of time. Fine-grained flow-size measurement and estimation can be a significant problem in network monitoring which can provide desired (e.g., essential) information for different network applications, including network design, operation and management, and security.

Flow size estimation can be desirable (e.g., suitable, advantageous, or important) in many networking applications. There typically are two main approaches for flow size measurement and estimation. In one approach, direct flow size measurements, such as NetFlow and sFlow, can offer relatively fine-grained flow size estimates. However, in large-scale networks it often can be inefficient and even infeasible to monitor each and every flow due to the exploding volume of traffic and limited monitoring resources such as flow-table/Internet Protocol (IP)-table entries, ternary content addressable memory (TCAM) entries, storage capacity, and processing power. Accordingly, at least in large-scale networks, direct flow-size measurement techniques may not be scalable due to the hard resource constraint of measurement resources.

In another approach, there are flow-size estimation techniques where the size of flows can be estimated using a set of link-loads or flow-aggregated measurements. In networking, this problem is known as Traffic Matrix (TM) estimation. In this method, the ultimate accuracy of flow-size estimates can be a function of the characteristics of the flow sizes (e.g. the underlying probability distribution function of traffic flows), the characteristics of provided link-loads and flow-aggregated measurements, and the estimation technique.

In software-defined networks (SDNs), user-defined flow-aggregated measurements can be provided by installing flow-table/ternary content addressable memory (TCAM) rules on SDN-enabled switches and routers (e.g., using counters associated with TCAM/flow-table rules). Accordingly, a compressed set of informative flow-aggregated measurements can be provided which can lead to a relatively more desirable flow-size estimation accuracy via the application of network inference techniques. Such a source of information can be transmitted from SDN-enabled devices (e.g., switches and routers supporting OpenFlow) to a centralized network controller. Consequently, using these measurements and by applying different estimation techniques, the size of flows can be estimated at the controller. It is noted that other auxiliary measurements (e.g., simple network management protocol (SNMP) link-loads) also can be available at the controller and can be used for flow-size estimation.

To provide user-defined flow-aggregated measurements, which can lead to a more desirable flow-size estimation accuracy, SDN users typically have to be able to aggregate flows based on their needs to provide the informative aggregated-flow measurements in such a way that incoming packets can be uniquely classified by matching against flow-table/TCAM rules inside network devices. In fact, the characteristics of flow-aggregated measurements can totally, or at least primarily, depend on the constriction of flow-table or TCAM rules, which can be installed on the SDN devices across the network.

A significant part of a flow-table/TCAM entry in a SDN device can be the IP-tuple <source IP, destination IP>. Therefore, the ability of providing user-defined flow-aggregated measurements mainly can be constrained with the capability of combining different IP-tuples <source IP, destination IP> and forming a unique flow-table/TCAM entry. This problem is known as a flow-aggregation feasibility constraint, wherein it can be quite difficult, if not impossible, to form an aggregated IP-tuple <aggregated source IPs, aggregated destination IPs> that can represent a set of desirable IP tuples. This primarily can be due to the method through which IPs are originally assigned to network nodes (e.g., servers, computers, virtual machines). In networking, IP addresses can be assigned to network nodes from a pool of IP addresses, typically using dynamic host configuration protocol (DHCP), which can utilize different strategies in assigning IP addresses (e.g., least recently used IP address). However, DHCP servers generally assign IPs without considering flow aggregation feasibility constraint.

Consequently, the capability of using a compressed set of informative flow-aggregated measurements (e.g., through use of flow-table/TCAM rules for SDNs) can be significantly limited by the flow-aggregation feasibility constraint where flows with different IP addresses cannot be aggregated, and constructing a unique flow-table/TCAM entry, that represents a set of flows, can be quite difficult or impossible.

With particular regard to cloud communications, data communications can be performed in cloud networks, for example, using cloud applications. Modeling, estimation, and prediction of flow size and performance indicators, such as key performance indicators (KPIs), can be desirable (e.g., suitable, advantageous, or important) in cloud networking applications. As disclosed, the flow-aggregation feasibility constraint can make flow size measurement and estimation quite difficult.

In that regard, techniques for enhancing the assignment of IP addresses to virtual machines (VMs), and estimating or determining flow sizes for VMs, are presented. In accordance with various aspects, the disclosed subject matter can comprise a cloud management component (e.g., a cloud management or controller component) that can control resources, services, etc., in a network (e.g., a cloud or communication network). The cloud management component can comprise an assignment management component that can resolve or mitigate the flow-aggregation feasibility constraint by assigning IP addresses to network nodes (e.g., VMs) in an intelligent way with respect to an application and based at least in part on the characteristics (e.g., attributes or needs) of the application, as more fully described herein.

Also, as disclosed, in traditional networking applications, the flow sizes and performance indicators can be measured and estimated. However, in cloud networking, the VMs of a project/tenant can be instantiated by defining a set of parameters which reflect the behavior of the traffic generated by VMs and affect the flow sizes and performance indicators of VMs.

In accordance with various aspects of the disclosed subject matter, the cloud management component also can comprise an estimator component that can use these parameters (e.g., pre-defined parameters) of a VM to determine (e.g., compute) a mathematical model for the flow size and/or other performance indicators of VMs. The parameters of a VM can comprise, for example, the flavor size, number of virtual central processing units (vCPUs) presented to the instance (e.g., to the VM), memory size (e.g., random access memory (RAM) size), disk space, communications bandwidth factor (e.g., receive and transmit (RXTX) factor), attached storage sizes, and/or another parameter(s). The estimator component can effectively determine such a model using different regression and machine learning techniques, wherein the estimator component can use the model to estimate and predict the flow size and other performance indicators of VMs. For instance, the estimator component can use such parameters of a VM to model and predict the behavior of VMs in cloud networks. In accordance with various embodiments, the estimator component and/or an evaluator component (e.g., of the assignment management component) can use the parameters of VMs and the flow-size estimates, which can be determined based at least in part on the parameters of VMs, to pre-evaluate some of the performance metrics (e.g., KPIs, such as latency and/or data packet loss) of VMs in cloud networks, wherein the performance metrics can be used for a variety of applications (e.g., VM placement, cloud orchestration, traffic engineering, load balancing, and/or attack/anomaly detection), as more fully described herein.

As part of the enhanced assigning of IP addresses, the assignment management component can group respective VMs into respective groups based at least in part on the respective flow-size estimations or determinations. The respective groups can comprise, for example, a group of VMs with a large flow size, a group of VMs with a medium flow size, a group of VMs with a small flow size, and/or a group of VMs with a tiny flow size. A pool (e.g., set) of IP addresses can be available for assignment to the VMs. The assignment management component can assign respective subsets of IP addresses from the pool of IP addresses to the respective groups of VMs. In some implementations, a subset of IP addresses assigned to a group of VMs can be a subset of consecutive IP addresses. The assignment management component can assign (e.g., automatically (or manually) assign or select) an IP address to a VM of a group from the subset of IP addresses assigned to such group to which that VM belongs. In assigning or selecting an IP address for a VM of a group of VMs, the assignment management component can employ a desired assignment procedure or algorithm, such as, for example, the first available IP address in the subset of IP addresses associated with the group, the least used IP address in the subset of IP addresses associated with the group, or another IP address assignment strategy or algorithm.

By the assignment management component employing the enhanced assignment of IP addresses to VMs, a set of desirably (e.g., most) informative and compressed flow-aggregated measurements can be provided, which can lead to high flow-size estimation accuracy via applying, for example, network inference techniques. This can be beneficial and of significance in large-scale networks and under hard resource constraints of limited flow-table/TCAM sizes in SDN switches and routers. This disclosed subject matter also can make network operation and management easier and faster, as compared to other techniques for network operation and management.

In cloud applications, with further regard to the flow size estimations or determinations for VMs, the estimator component or another component (e.g., the evaluator component) of the disclosed subject matter can employ such a model (e.g., the pre-evaluated metrics as modeled) for different applications, such as, for example, VM placement, cloud orchestration, traffic engineering, load balancing, and attack/anomaly detection. Further, the model (e.g., the pre-evaluated metrics as modeled) can make the applications more predictive and robust against future changes in operation.

These and other aspects and embodiments of the disclosed subject matter will now be described with respect to the drawings.

Referring now to the drawings, FIG. 1 illustrates a block diagram of an example system 100 that can enhance network address assignments (e.g., Internet Protocol (IP) address or media access control (MAC) address assignments) and flow-size estimations or determinations associated with nodes (e.g., virtual machines (VMs)) in a network (e.g., a cloud or communication network), in accordance with various aspects and embodiments of the disclosed subject matter. The system 100 can comprise a cloud management component 102 (e.g., cloud management or controller component) that can control the use of resources, services, etc., in a network (e.g., a cloud or communication network). The resources can comprise, for example, computing resources, storage resources, data or database resources, network resources, IP addresses, MAC addresses, and/or other resources that can be part of or associated with the communication network.

In accordance with various embodiments, the cloud management component 102 can comprise a compute component 104 that can provide computing resources and services, and/or can facilitate provisioning and managing VMs. The compute component 104 can provide scalable and on-demand access to the computing resources, including VMs, servers, and/or containers. In some embodiments, the compute component 104 can be or can comprise OpenStack Nova, although, in other embodiments, a different type(s) of computing resource(s) associated with a cloud platform other than OpenStack can be employed by the compute component 104.

The cloud management component 102 also can include a storage component 106 that can provide storage resources (e.g., memory) and services. The storage component 106 can provide scalable access to the storage resources. Various types of data, including VMs, data utilized by VMs, user data, and/or other data, can be stored in and accessed from the storage component 106. In accordance with various embodiments, the storage component 106 can be or can comprise OpenStack Cinder (e.g., for block storage) and/or Swift (e.g., for object storage). In other embodiments, a different type(s) of storage resource(s) associated with a cloud platform other than OpenStack can be employed by the storage component 106.

The cloud management component 102 further can comprise one or more other types of resource components, such as a database component 108 that can provide database resources and services. The database component 108 can provide scalable access to the database resources, which can include relational and/or non-relational database engines, databases, and/or task performance and/or management. The database component 108 can perform and/or can enable the provisioning and/or managing of one or more database instances, as desired. In some embodiments, the database component 108 can be or can comprise OpenStack Trove. In other embodiments, a different type(s) of database resource(s) associated with a cloud platform other than OpenStack can be employed by the database component 108.

The cloud management component 102 also can include a network component 110 that can provide networking resources and services to facilitate creating a desired network(s), network topologies, and/or network policies (e.g., in the cloud). The network component 110 can provide scalable networking, access to the networking resources, and/or task performance and/or management. In some embodiments, the network component 110 can be or can comprise OpenStack Neutron, which can comprise a cloud networking controller and networking-as-a-service (NaaS) project within the OpenStack cloud network environment. In other embodiments, a different type(s) of network resource(s) associated with a cloud platform other than OpenStack can be employed by the network component 110. The network component 110 (e.g., Neutron or other network resource(s)) can comprise application program interfaces (APIs), plug-ins, components, authentication and authorization control protocols and components, etc., that can facilitate interoperability of network devices and network-related technologies in a cloud network environment.

The network component 110 can be associated with (e.g., communicatively connected to) the compute component 104, the storage component 106, and the one or more other types of components, including the database component 108, to facilitate providing one or more devices (e.g., communication devices), which can be associated with the network component 110, access to the respective resources and/or services of or associated with the compute component 104, the storage component 106, and the one or more other types of components (e.g., database component 108).

The network component 110 can be associated with (e.g., communicatively connected to) a communication network 112 that can facilitate communications between the network component 110 and associated resources of the compute component 104, the storage component 106, and the one or more other types of components (e.g., database component 108) and devices, such as, for example, device 114, device 116, and device 118, associated with (e.g., communicatively connected to) the communication network 112. The respective devices (e.g., 114, 116, and/or 118) can be a communication device that can communicate with the communication network 112 and associated devices or components via a wireline or wireless communication connection with the communication network 112. The devices (e.g., 114, 116, and/or 118) can be, for example, a mobile phone (e.g., a wireless or cellular phone), a computer (e.g., a desktop or laptop computer), an electronic notebook, an electronic pad or tablet, an electronic gaming device, a personal digital assistant (PDA), a set-top box, or other type of communication device that can operate and communicate in a communication network environment of the communication network 112 of the system 100.

The communication network 112 can comprise an overlay/underlay network component 120 that can facilitate communication of traffic between the devices (e.g., 114, 116, and/or 118) and the network component 110 and associated components (e.g., compute component 104, storage component 106, database component 108) and resources and/or services of the cloud management component 102 as well as between the respective devices (e.g., 114, 116, and/or 118). The overlay/underlay network component 120 can comprise an underlay network that can comprise the physical infrastructure of the communication network 112, wherein the physical infrastructure can comprise the physical components, such as switches, routers, interfaces, controllers, nodes, etc., that can be arranged and configured in relation to each other to form the underlay network and to facilitate communication of traffic between devices in the communication network 112. The underlay network can communicate data packets, and can manage or facilitate management of the communication of data packets, across networks, or portions thereof, of the communication network 112. The overlay/underlay network component 120 also can include the overlay network that can be a virtual network that can comprise one or more network overlays that can be associated with (e.g., communicatively connected to) the physical network of the underlay network and can operate on top of the physical network of the underlay network. Network overlays can employ techniques of using software virtualization to create the one of more additional network overlays that can be overlaid on the physical network of the underlay network.

The overlay/underlay network component 120 can comprise, for example, routers, such as routers 122, 124, 126, and 128, as well as other network-related components (e.g., switches, interfaces, controllers, and/or nodes, . . . (not shown in FIG. 1)) that can be associated therewith. The respective routers (e.g., routers 122, 124, 126, and/or 128) can be associated with (e.g., communicatively connected to) respective VMs, such as, for example, VMs 130, 132, and 134). It is to be appreciated and understood that, in accordance with various embodiments, the number of routers of the system 100 can be four, more than four, or less than four. It also is to be appreciated and understood that, in accordance with various embodiments, the number of VMs of the system 100 can be three, more than three, or less than three.

Figure 2:
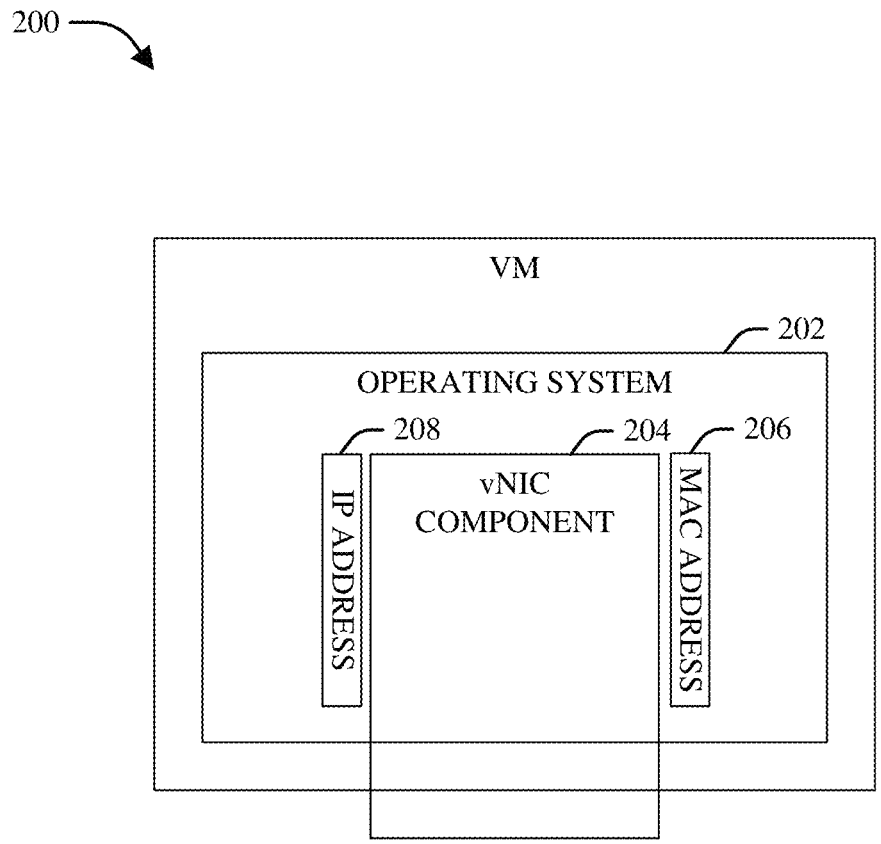
FIG. 2 depicts a block diagram of an example virtual machine, in accordance with various aspects and embodiments of the disclosed subject matter.

Referring briefly to FIG. 2 (along with FIG. 1), FIG. 2 depicts a block diagram of an example VM 200, in accordance with various aspects and embodiments of the disclosed subject matter. The VMs 130, 132, and/or 134 of FIG. 1 can be the same as or similar to the VM 200 of FIG. 2. The VM 200 can emulate or function as a real physical machine (e.g., physical computer or server), and can be employed as a substitute for, and can be utilized in place of, the real physical machine. The VM 200 can comprise an operating system 202 that can be executed by the VM 200 to perform operations, manage hardware and/or software resources, and/or provide services and functionality for programs or routines of or associated with the VM 200. The operating system 202 also can act as an intermediary between programs and hardware resources of or associated with the VM 200. The operating system 202 can have a desired structure (e.g., can have a desired architecture) and functionality that can be suitable for the purposes for which the VM 200 is to be used.

The VM 200 also can comprise or be associated with a virtualized network interface card (vNIC) component 204 that can be utilized by the VM 200 as a network interface to interface with the communication network 112, including, for example, the underlay network of the overlay/underlay network component 120. The vNIC component 202 can emulate or function as, and can be designed and configured based at least in part on, a real physical network interface card (NIC), and the vNIC component 204 can be employed as a substitute for, and can be utilized in place of, the real NIC. For instance, the vNIC component 204 can be the network interface controller for the host (e.g., VM 200) in a same or similar way that a NIC can be a physical network interface controller for a host. While one vNIC component 204 is depicted in FIG. 2, in some embodiments, the VM 200 can comprise more than one vNIC component 204.

The vNIC component 204 can have a MAC address 206 (e.g., a MAC address unique to that vNIC component 204) assigned to it (e.g., by the assignment management component 136 or another component of or associated with the system 100). The MAC address 206 can be a unique identifier that can be assigned to the vNIC component 204 to facilitate identification of the vNIC component 204 and facilitate data communications between the vNIC component 204 and other components or devices associated with the communication network 112. In some implementations, the MAC address 206 can be assigned to the vNIC component 204 (e.g., by the assignment management component 136) using the enhanced network address techniques and algorithms of the disclosed subject matter, as more fully described herein.

The VM 200 also can have an IP address 208 assigned to it and/or the vNIC component 204 (e.g., by the assignment management component 136), wherein the IP address 208 can be assigned to the VM 200 and/or vNIC component 204 using the enhanced network address techniques and algorithms of the disclosed subject matter, as more fully described herein. The IP address can be used to identify or label the VM 200 (or vNIC component 204), so that other components or devices associated with the communication network 112 can identify the VM 200 (or vNIC component 204). The IP address also can be used to facilitate location addressing to facilitate identifying where the VM 200 resides in relation to other hosts, components, or devices associated with the communication network 112.

With further regard to FIG. 1, in some embodiments, the disclosed subject matter can enhance assignment of network addresses (e.g., IP addresses or MAC addresses) to network nodes (e.g., VMs) of or associated with the overlay/underlay network component 120 based at least in part on flow sizes of the network nodes, as more fully described herein. In other embodiments, the disclosed subject matter can enhance the accuracy of flow-size estimates associated with network nodes (e.g., VMs, such as VMs 130, 132, 134, . . . ) of or associated with the overlay/underlay network component 120, as more fully described herein. It is to be appreciated and understood that, in addition to VMs being nodes (e.g., network nodes), nodes can be or can comprise servers, computers, or other components or devices of or associated with the overlay/underlay network component 120.

It is to be appreciated and understood that, while the disclosed subject matter often refers to VMs, the various aspects, techniques, and principles of the disclosed subject matter also can be applicable to other types of nodes (e.g., network nodes) of or associated with the overlay/underlay network component 120. Also, it is to be appreciated and understood that, while the disclosed subject matter often refers to IP addresses, the various aspects, techniques, and principles of the disclosed subject matter also can be applicable to other types of network addresses (e.g., MAC addresses) of or associated with the overlay/underlay network component 120.

In accordance with various aspects and embodiments, the network component 110 can comprise an assignment management component 136 (e.g., an intelligent IP assignment agent (IIPAA)) that can desirably assign respective network addresses (e.g., IP addresses or MAC addresses) to network nodes (e.g., VMs, such VMs 130, 132, 134, . . . ) based at least in part on the respective volumes of traffic being handled by (e.g., respective flow sizes associated with) the respective network nodes, in accordance with defined assignment criteria. With regard to flow-size estimation, aggregating flows with similar sizes or volumes (e.g., similar statistical behavior or characteristics) can significantly improve the accuracy of flow-size estimates of nodes (e.g., VMs that are or are associated with nodes).

The assignment management component 136, by assigning respective network addresses to network nodes based at least in part on the respective flow sizes associated with the respective network nodes, can significantly improve flow-size estimation accuracy and/or can significantly reduce the number of flow-table/TCAM rules employed, which can be a significant and advantageous factor due to the hard resource constraints of limited flow-table/TCAM sizes in SDN switches (e.g., SDN-enabled or SDN-compatible switches). The flow-table/TCAM rules can be utilized by, for example, the network controller component 138 of the network component 110 and/or network-related devices or components (e.g., SDN switches or other SDN network-related devices) of the overlay/underlay network component 120 to route traffic (e.g., data packets) and facilitate communications (e.g., communication of the traffic) in the communication network 112.

In practice, the flexibility for assigning IP addresses can be relatively low in traditional networks, and it can be difficult to estimate, in advance, the size of traffic handling by a node, which can represent the inbound and outbound flow-size of the node. The disclosed subject matter can efficiently address such issues in cloud computing networks where SDN can be employed as a technology for virtualizing networks among multiple tenants. In accordance with various aspects of the disclosed subject matter, in cloud computing environments, there can be a relatively higher flexibility to assign IP addresses to VMs (e.g., 130, 132, 134, . . . ) from a pool of IP addresses (e.g., private IP addresses) that can be allocated to a particular project or tenant. The assignment management component 136 can leverage such flexibility in assigning IP addresses to VMs to facilitate enhancing the assignment of IP addresses to VMs, as more fully described herein.

In some embodiments, the assignment management component 136 can comprise an estimator component 140 that can estimate, determine, and/or measure flow sizes (e.g., traffic volumes) associated with network nodes (e.g., VMs, such as VMs 130, 132, 134, . . . ). For instance, for a network node(s) (e.g., for each of one or more network nodes), the estimator component 140 can estimate (e.g., can determine or calculate an estimation of) the traffic volume handling by a network node (e.g., a VM), which can represent the size of the flow associated with the network node, based at least in part on (e.g., as a function of) defined (e.g., defined or predefined) parameters associated with the network node. The defined parameters associated with the network node can comprise, for example, the parameters of the flavor of the network node (e.g., flavor size of the VM, number of virtual central processing units (vCPUs) presented to the instance or VM, memory size associated with the VM, ephemeral disk space associated with the VM, and/or communications bandwidth factor associated with the VM), the type and volume of attached storages to the network node, and/or the type or size of a database (DB) associated to the network node.

The communications bandwidth factor can be, for example, a receive and transmit (RXTX) factor that can define the network capacity of an instance and/or can represent the aggregate outbound bandwidth across all attached network interfaces. An RXTX factor, for example, can be a scaling factor that can enable servers to have a different bandwidth capacity than the bandwidth capacity defined in the network to which the servers are attached. The RXTX factor can be multiplied by the RXTX base property of the network, wherein the default RXTX factor can be 1.0 (e.g., the same as the network to which the servers are attached), and such factor can be adjusted to be greater than 1.0 or less than 1.0.

Flavors of a VM (e.g., VM 130) can define, for example, a number of parameters, such as parameters relating to the computing, memory, and/or storage capacity of computing instances or VMs. The various parameters, as selected by a user, can enable the user to have a choice with regard to the type and/or configuration of the VM that the user would like to run, similar to how a user can select a type of physical server. For instance, a flavor of a VM can be an available hardware configuration for a server, and can define the size of a VM (e.g., virtual server) that can be launched in the communication network 112 (e.g., launched in the overlay network of the overlay/underlay network component 120).

In determining network address assignments, the assignment management component 136 can operate on a reasonable assumption that, for example, a VM (e.g., VM 130) with a larger flavor-size and a higher RXTX factor, can have heavier traffic and a larger flow size as compared to another VM (e.g., VM 132) with a relatively smaller flavor-size and a relatively lower RXTX factor. In some implementations, the assignment management component 136 can access and utilize other information from other services (e.g., other information from the database services provided by the database component 108) to facilitate desirably determining and assigning IP addresses to VMs (e.g., 130, 132, 134, . . . ).

As disclosed herein, the assignment management component 136 can utilize information provided by other services to desirably (e.g., efficiently, suitably, or optimally) allocate and assign network addresses (e.g., IP addresses) to VMs (e.g., 130, 132, 134, . . . ), wherein the other services can comprise, for example, computing services from the compute component 104, storage services from the storage component 106, and/or information or database services from the database component 108. As more fully described herein, with regard to a pool (e.g., set) of IP addresses that can be associated with a project, the assignment management component 136 can partition the pool of IP addresses into a desired number of groups (e.g., sub-groups or subsets) of IP addresses, based at least in part on the application(s) and/or project (e.g., the requirements or specifications of the application(s) and/or project), in accordance with the defined assignment criteria.

Each sub-group of IP addresses can comprise a respective number of IP addresses that can be different from or same as the respective numbers of IP addresses of the other sub-groups of IP addresses. The IP addresses in a sub-group of IP addresses can be consecutive IP addresses (e.g., IP addresses can be in consecutive order in relation to each other). The assignment management component 136 also can associate (e.g., can assign) respective sub-groups of IP addresses respective names or indexes (e.g., large, medium, small, and/or tiny, . . . ), based at least in part on the number of different sub-groups of IP addresses and the respective types of (e.g., respective range of flow sizes associated with) the respective sub-groups of IP addresses, in accordance with the defined assignment criteria.

For a given VM (e.g., 130) of one or more VMs (e.g., 130, 132, and/or 134, . . . ) associated with the project, the estimator component 140 can apply a function $f$ on a set of defined parameters of the VM (e.g., flavor size, attached storage size, and/or RXTX factor, associated with the VM) to generate an output that can be an estimate of the flow size of the VM (e.g., an estimate of a potential flow size of the VM) and the particular name or index of the sub-group of IP addresses to which the VM belongs, wherein the function $f$ can be and can operate, as more fully described herein.

The assignment management component 136 can assign (e.g., can automatically or manually select and/or assign) an IP from a list of available IP addresses of the sub-group of IP addresses associated with the particular name or index (e.g., the group to which the VM belongs), based at least in part on a defined assignment procedure or algorithm, in accordance with the defined assignment criteria. In accordance with various aspects or embodiments, the defined assignment procedure or algorithm can be the first available IP address of the sub-group of IP addresses, or can be the least used IP address of the sub-group of IP addresses, or can be another desired assignment procedure or algorithm. In accordance with the applicable assignment procedure or algorithm, the assignment management component 136 can assign the first available IP address of the sub-group, the least used (and available) IP address of the sub-group, or another available IP address of the sub-group (in accordance with another assignment procedure or algorithm) to the VM.

The assignment management component 136 (or another component of the system 100) also can determine a desirable set of IP-table/flow-table/TCAM rules (e.g., a compressed set having a reduced number of such rules) that can be employed with regard to network devices (e.g., SDN switches or other SDN devices), based at least in part on the respective flow-size estimates of respective VMs and/or via application of network inference techniques or algorithms, as more fully described herein. The desirable set of IP-table/flow-table/TCAM rules can be a compressed or reduced set of IP-table/flow-table/TCAM rules that can provide desirably informative (e.g., suitably informative, optimally informative, or most informative) flow-aggregated measurements for flow-size estimation associated with VMs (e.g., 130, 132, 134, . . . ).

The network controller component 138 (e.g., SDN controller) can receive the desirable (e.g., compressed or reduced) set of IP-table/flow-table/TCAM rules from the assignment management component 136, or the network controller component 138 can identify such rules, and access and retrieve, such rules from a storage component (e.g., storage component 106) or other data source. The network controller component 138 can install (e.g., proactively, actively, automatically, or dynamically install) the desirable set of IP-table/flow-table/TCAM rules on the SDN network devices (e.g., SDN-enabled or SDN-compatible network devices, such as SDN-enabled or SDN-compatible switches).

Figure 3:
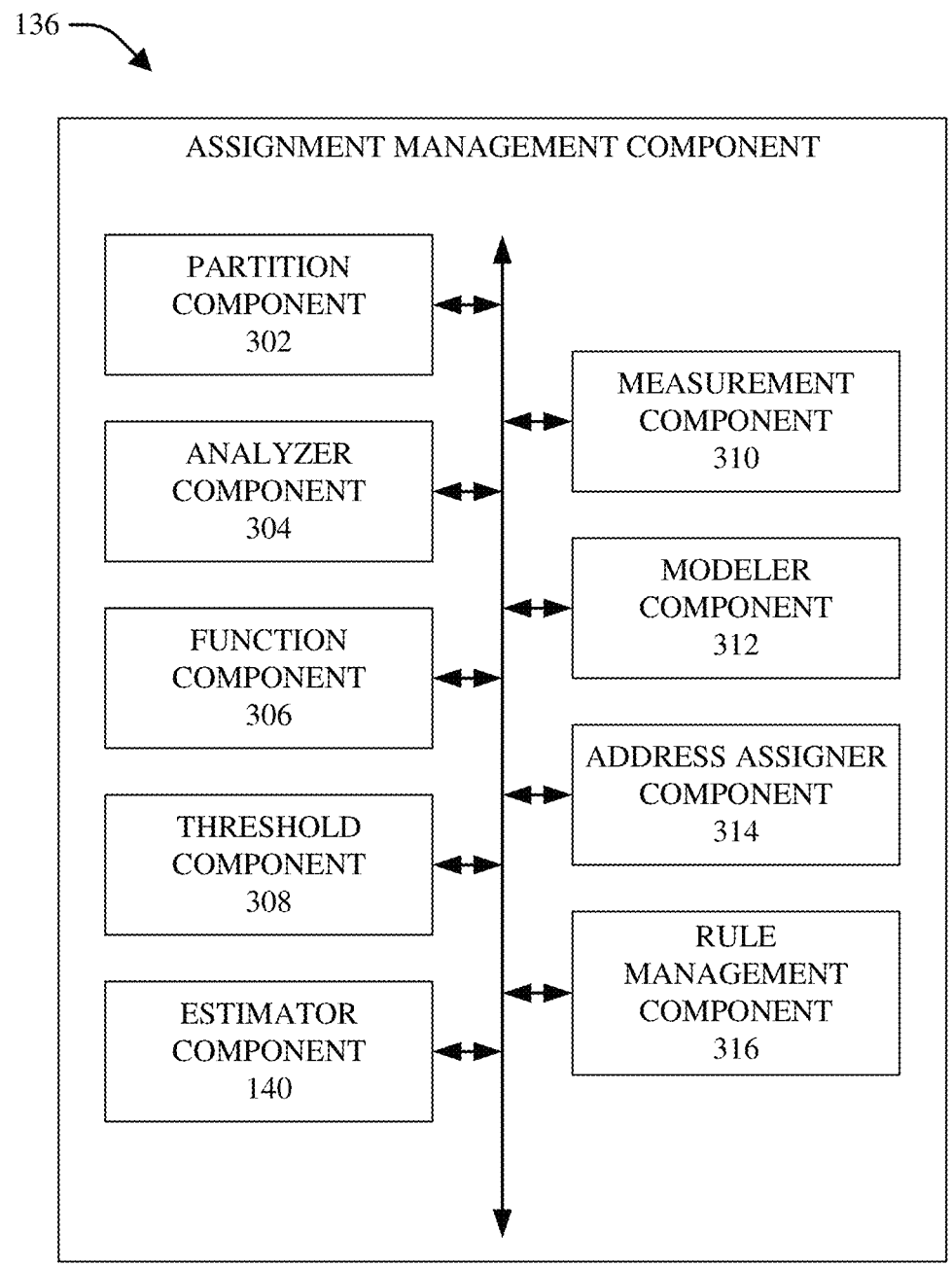
FIG. 3 presents a block diagram of an example assignment management component, in accordance with various aspects and embodiments of the disclosed subject matter.

The following disclosed subject matter can further illustrate various aspects and embodiments of the enhanced IP assignment techniques, process, and algorithm for assigning IP addresses in cloud computing environments. Referring to FIG. 3 (along with FIG. 1), FIG. 3 illustrates a block diagram of an example assignment management component 136, in accordance with various aspects and embodiments of the disclosed subject matter. The assignment management component 136 can comprise the estimator component 140, which can perform tasks and can function as more fully described herein.

To facilitate illustrating various aspects and embodiments, consider a set or a pool of IP addresses that can be denoted by I. The assignment management component 136 can comprise a partition component 302 that can partition the set (e.g., pool) of IP addresses into L groups (e.g., L sub-groups) of respective IP addresses. In some embodiments, the partition component 302 can partition the set of IP addresses into L sub-groups of respective IP addresses, wherein the respective sub-groups can comprise respective subsets of consecutive IP addresses that can comprise respective numbers of IP addresses. These L sub-groups can be denoted by $I_1$ up through $I_L$ (e.g., $I_1, \ldots, I_L$), wherein L can be virtually any desired number, and wherein each sub-group also can also have a desired name or index, such as, for example, large, medium, small, and/or tiny (e.g., in this case where L=4). While this example involves four sub-groups (e.g., with L=4), the disclosed subject matter can employ a desired number of sub-groups that can be less than four, four, or greater than four, for example, as specified by the defined assignment criteria.

In an example case, $I = \bigcup_{i=1}^{L} I_i$ where $I_i \cap I_j = \emptyset$ for $i,j \in \{1, \ldots, L\}$ (e.g., {1 up through L}) and $i \neq j$. It is noted that the number of IP addresses in each sub-group can be different (or the same), that is, the cardinality of set $I_i$ (denoted by $|I_i|$) for all $i \in S = \{1, \ldots, L\}$ are not necessarily equal. The partitioning of the set of IP addresses by the partition component 302 can depend, at least in part, on the application(s) (e.g., associated with the project) and the respective specifications or requirements of the application(s). For example, based at least in part on the specifications or requirements of the application, with I=254, for a pool of 254 IP addresses (e.g., subnet 10.0.0.0/24, excluding 10.0.0.0 and 10.0.0.255), the partition component 302 can partition of the pool of 254 IP addresses, and can assign 16 consecutive IP addresses to VMs determined to have a large flavor size (in the sub-group named or indexed as large), 32 consecutive IP addresses to VMs determined to have a medium flavor size (in the sub-group named or indexes as large), 64 consecutive IP addresses to VMs determined to have a small flavor size (in the sub-group named or indexed as small), and 142 consecutive IPs to VMs determined to have a tiny flavor size (in the sub-group named or indexed as tiny).

In some implementations, the assignment management component 136 can comprise an analyzer component 304 that can analyze information relating to the specifications and/or requirements of the application to facilitate determining the number (e.g., L=4) of sub-groups of VMs to employ, the respective numbers of IP addresses to assign to the respective sub-groups, the respective ranges or threshold values (e.g., threshold flow-size values) to assign to the respective sub-groups and associated names or indexes, etc. The partition component 302 can partition the set of IP addresses into the respective sub-groups of IP addresses, assigning the respective numbers of IP addresses (e.g., consecutive IP addresses) to the respective sub-groups of IP addresses, based at least in part on the results of the analysis by the analyzer component 304.

The analyzer component 304 also can operate in conjunction with the estimator component 140 to analyze one or more parameters or characteristics associated with a VM (e.g., VM 130) to facilitate determining an estimated flow size associated with the VM, as more fully described herein. The estimator component 140, applying a desired function (e.g., function $f$), can facilitate determining the estimated flow size associated with the VM, based at least in part on the analysis results obtained (e.g., by the analyzer component 304) from the analysis of the one or more parameters or characteristics associated with the VM and the function applied to the one or more parameters or characteristics associated with the VM (e.g., the function applied to the analysis results relating to the one or more parameters or characteristics).

The assignment management component 136 also can include a function component 306 that can comprise one or more functions, and facilitate the application of one or more of the functions to data to determine or generate an output (e.g., output data results) of the function(s). The function component 136 can be employed to facilitate determining respective estimations of flow sizes associated with VMs (e.g., 130, 132, 134, . . . ), based at least in part on respective parameters or characteristics associated with the VMs, and determining respective classifications for respective flow-size estimations and associated VMs based at least in part on the respective flow-size estimations of the respective VMs, as more fully disclosed herein.

With respect to each VM of one or more VMs (e.g., 130, 132, and/or 134, . . . ) associated with the project, for a given VM with a given flavor, the assignment management component 136, employing the estimator component 140 and the function component 306, can apply a function, which can be denoted by $f$, to a set of available and/or defined (e.g., predefined) parameters or characteristics associated with the VM. The set of available and/or defined parameters or characteristics can comprise one or more parameters or characteristics. The parameters or characteristics can comprise, for example: 1) the parameters associated with the flavor of the VM, such as a flavor size of the VM, a number of vCPUs (e.g., number of cores) associated with the VM, a memory size (e.g., random access memory (RAM) size) associated with the VM, an ephemeral disk space associated with the VM, a communications bandwidth factor (e.g., RXTX factor) associated with the VM, and/or a swap space associated with the VM; 2) an amount of volume storage and/or block storage associated with (e.g., attached to) the VM; and/or 3) one or more other parameters (if available), such as the hardware characteristics of a server that runs the VM (e.g., the speed and/or type of the physical NIC card). In some implementations, the parameters or characteristics also can comprise the type and/or characteristics of hypervisors and the application(s) associated with the VM, wherein the assignment management component 136 (and estimator component 140) can directly consider such type and/or characteristics of hypervisors and the application(s) as parameters of the function $f$ of the function component 306. In other implementations, the assignment management component 136 (and estimator component 140) can determine (e.g., calculate or compute) this function on a per hypervisor and/or per application basis (e.g., determine respective functions for respective hypervisors and/or respective applications).

For instance, the assignment management component 136 (or another component of or associated with the system 100) can denote the parameters or characteristics of function $f$ by a vector X of size (n×1), wherein, for example:
$x_1$=the number of vCPUs, $x_2$=VM's memory size,
$x_3$=VM's ephemeral disk space, $x_4$=VM's RXTX factor,
$x_5$=the amount of volume storage, and/or
$x_6$=the amount of block storage, etc. (e.g., up through $x_n$),
and wherein n can be virtually any desired number.

The assignment management component 136, employing the estimator component 140, can apply the function $f$ of the function component 306 to the set of available and/or defined parameters or characteristics associated with the VM (e.g., VM 130), and can classify an estimate of the flow size of the VM into one of the L classes/sub-groups (e.g., large, medium, small, and tiny, where L=4), wherein the estimator component 140 can estimate an amount (e.g., how heavy) the flow size of the VM (e.g., the inbound and outbound traffic of the VM) can be, based at least in part on the function $f$ and the set of available and/or defined parameters or characteristics. The assignment management component 136 (and estimator component 140), by applying (and based at least in part on the application of) the function $f$ to such parameters or characteristics, can determine or generate an output of the function $f$ that can be an estimate of a potential flow size of the VM and can determine the name or index of the sub-group (from the set S={1, . . . , L}) to which the VM can belongs. The function $f$ can belong to any, or at least virtually any, set of continuous, discrete, or heuristic functions, or their combinations.

For example, the function $f$ can be defined as Equation (1) as follows:

$$f = \begin{cases} 1 & \text{if } 0 < g(X) \leq thr_1 \\ 2 & \text{if } thr_1 < g(X) \leq thr_2 \\ \vdots & \\ L-1 & \text{if } thr_{L-1} < g(X) \leq thr_L \\ L & \text{if } g(X) > thr_L \end{cases} \quad (1)$$

wherein the function g(X) (e.g., of the function component 306) can be used (e.g., applied) by the estimator component 140 to determine (e.g., compute) an estimate of the flow-size of a VM as a function of the set of parameters, as denoted by vector X, and wherein the variable thr ($thr_1$, $thr_2$, up through $thr_L$) can be thresholds (e.g., flow-size thresholds) used by the assignment management component 136 to appropriately classify the flow-size estimate of the VM (and thus, classify the VM) into the corresponding class or sub-group of the L classes or sub-groups to which the flow size and associated VM belong, based at least in part on the thresholds.

In some implementations, the assignment management component 136 can comprise a threshold component 308 that can determine, facilitate determining, and/or comprise information relating to thresholds that can be employed to facilitate classifying flow-size estimates and associated VMs (e.g., 130, 132, 134, . . . ) to facilitate placing the VMs in appropriate classes or sub-groups of VMs. The thresholds of the threshold component 308 can be respective flow-size estimate values that can define respective ranges of flow sizes associated with VMs that can be associated with respective classes or sub-groups of flow sizes (e.g., large, medium, small, and/or tiny, . . . ). With regard to each of the one or more VMs, the assignment management component 136 can compare the estimate of the flow size associated with the VM to the threshold values, and can determine the class or sub-group to which the flow size and associated VM belong based at least in part on the results of the comparison, in accordance with the defined assignment criteria.

For instance, if the estimator component 140 (of the assignment management component 136) determines that the flow size of a VM (e.g., VM 130) can have a first flow-size value (e.g., g(X) for the VM can have a first flow-size value), the assignment management component 136 can compare the first flow-size value to the threshold values (e.g., as provided by the threshold component 308). If, based at least in part on the threshold comparison, the assignment management component 136 determines that the first flow-size value is located in the range defined by $thrs_1$ and $thrs_2$, the assignment management component 136 can determine that the first flow-size value and associated VM are to be classified as being part of the $2^{nd}$ class (or sub-group), which can be the "small" class (or group), wherein L=4, and class 1 is identified as the "tiny" class, class 2 is identified as the "small" class, class 3 is identified as the "medium" class, and class 4 is identified as the "large" class.

The function g(X) can be determined or generated by the assignment management component 136 (e.g., by the function component 306) or can be received by the assignment management component 136 from another component of or associated with the system 100. In some implementations, as more fully described herein, the function component 306 can update (e.g., modify, adjust, or refine) the function g(X), in accordance with the defined assignment criteria, wherein the updated function g(X) (e.g., g'(X)) can be used to determine flow sizes of VMs (e.g., 130, 132, 134, . . . ) that can have improved accuracy (e.g., can be closer to actual flow sizes of VMs) over the estimated VM flow sizes provided by the previous function g(X).

The function g(X) can model the flow-size of a VM (e.g., VM 130), can be defined in various different linear or non-linear forms, as desired (e.g., in accordance with the defined assignment criteria), and it can be determined (e.g., by the function component 306 or another component) on per project or per tenant basis or per classes of similar projects or tenants. In some implementations, without loss of generality, g(X) can be defined as g(X): $=A^T X$, wherein A can be a vector of size (n×1) defined as A:=$[a_1, a_2, \ldots, a_n]^T$, wherein n can be virtually any desired positive number. The entries of vector A can model the amount of the contribution of each parameter on the flow-size estimate of the VM. The function component 306 (or another component of or associated with the system 100) can determine the entries of vector A using one or more of different supervised and/or unsupervised machine learning techniques.

For example, in a supervised learning approach, the function component 306 (or other component) can utilize a set of training data to facilitate learning or determining the entries of vector A, wherein such training data set can be determined or generated (e.g., by the function component 306 (or other component)) based at least in part on measurements of real flow sizes of VMs with different parameters or characteristics of the VMs (which can be denoted by vector X), in a lab environment or in an operating cloud. In some implementations, the assignment management component 136 can comprise a measurement component 310 that can measure real flow sizes of VMs (e.g., 130, 132, and/or 134, . . . ) with (e.g., based at least in part on) the respective parameters or characteristics of the respective VMs. In some embodiments, the measurement component 310 can measure real flow sizes and/or performance indicators (e.g., KPIs) associated with VMs (or other components in the network) to facilitate generation of a model(s) associated with the VMs that can be determined (e.g., by a modeler component 312) based at least in part on the measured real flow sizes and/or performance indicators.

In some embodiments, the assignment management component 136 can comprise a modeler component 312 that can model (e.g., can generate or determine a model that can model) other performance metrics or performance indicators (e.g., KPIs) associated with VMs (e.g., 130, 132, 134, . . . ) based at least in part on (e.g., as a function of) parameters or characteristics associated with VMs. For example, the modeler component 312 can model (e.g., can generate or determine a model that can model) the latency or packet-loss between two VMs (e.g., $VM_1$ (e.g., 130) and $VM_2$ (e.g., 132)) as a function $g(X_1, X_2)$, wherein $X_1$ and $X_2$ can represent the respective parameters (e.g., flavor size, number of vCPUs, and/or memory size, . . . ) of $VM_1$ and $VM_2$. In this example case, in addition to or as an alternative to $X_1$ and $X_2$ representing the respective parameters (e.g., of the set of available and/or defined parameters) associated with the respective VMs, as disclosed herein, $X_1$ and $X_2$ can include one or more other parameters, such as the speed of physical NIC cards associated with the VMs and/or other network devices (e.g. switches and routers), the type and/or characteristics of hypervisors, and/or the physical location of servers running the two VMs. As further example, the modeler component 312 can use other parameters from other sources, such as the parameters or characteristics of the underlay network (e.g., the capacity of physical links and/or interfaces of the underlay network) and/or measured performance indicators (if such measurements are available) to facilitate determining and generating the model, which can model and correspond to such parameters or characteristics of the underlay network and/or the measured performance indicators. The modeler component 312 can determine such modeling of performance metrics or performance indicators associated with VMs per project or tenant or per classes of similar projects or tenants, with the same or similar behavior. The models determined and generated by the modeler component 312 can be employed by the assignment management component 136 and/or estimator component 140 to estimate and/or predict the flow size and/or other performance indicators (e.g., KPIs) associated with VMs. As a result, such models can be utilized (e.g., by the assignment management component 136) to provide a more predictive cloud networking environment that can facilitate enhanced network management and operation in cloud networks (e.g., highly dynamic cloud networks).

As an illustrative non-limiting example, which can be relatively less complex to illustrate certain aspects of the disclosed subject matter, the assignment management component 136 (e.g., the function component 306) can determine or generate a function $f$ that can be a one-to-one map between a flavor size of a VM (e.g., VM 130) and the potential flow-size estimate of the VM. Equation (2) can represent an example of function $f$ in this case, wherein there can be four classes or sub-groups that can be denoted by large, medium, small and tiny. In this example case, the assignment management component 136 can classify respective IP addresses of the set (e.g., group) of IP addresses into respective subsets (e.g., sub-groups) of the four subsets respectively named or indexed as large, medium, small, and tiny (for L=4), and the function $f$ can be defined as: $f(\{\text{Large}\}) \to \{\text{Large}\}$, $f(\{\text{Medium}\}) \to \{\text{Medium}\}$, $f(\{\text{Small}\}) \to \{\text{Small}\}$, $f(\{\text{Tiny}\}) \to \{\text{Tiny}\}$. For example, the assignment management component 136 can estimate a VM with a large flavor size to have a large flow size, and can classify the VM to the subset of IP addresses allocated for VMs with a large flow size.

$$f = \begin{cases} \text{Tiny} & \text{if } VM's\ FlavorSize = \text{Tiny} \\ \text{Small} & \text{if } VM's\ FlavorSize = \text{Small} \\ \text{Medium} & \text{if } VM's\ FlavorSize = \text{Medium} \\ \text{Large} & \text{if } VM's\ FlavorSize = \text{Large} \end{cases} \quad (2)$$

The assignment management component 136 also can comprise an address assigner component 314 that can assign network addresses to respective VMs (e.g., 130, 132, 134, . . . ) (or other network nodes), in accordance with the defined assignment criteria. For instance, after the assignment management component 136 has classified the respective VMs to respective sub-groups (e.g., subsets) of IP addresses based at least in part on the respective flow-size estimates of the respective VMs, with respect to each VM, the address assigner component 314 can assign (e.g., automatically or manually assign) an IP address from a list of available IP addresses of the sub-group of VMs to which the VM belongs, in accordance with a defined assignment algorithm or procedure, and the defined assignment criteria. In accordance with various embodiments, the assignment algorithm or procedure employed by the address assigner component 314 can be the first available IP address on the list of available IP addresses for the sub-group of VMs to which the VM belongs, the least used IP on the list of available IP addresses for that sub-group of VMs in each group, or any other desired assignment algorithm or procedure.

In some embodiments, the assignment management component 136 also can comprise a rule management component 316 that can determine a desirable set of IP-table/flow-table/TCAM rules (e.g., a compressed set having a reduced number of such rules) that can be employed with regard to network devices (e.g., SDN switches or other SDN devices), based at least in part on the respective flow-size estimates of respective VMs (e.g., 130, 132, 134, . . . ) and/or via application of network inference techniques or algorithms, as more fully described herein. The desirable set of IP-table/flow-table/TCAM rules can be a compressed or reduced set of IP-table/flow-table/TCAM rules that can provide desirably informative (e.g., suitably informative, optimally informative, or most informative) flow-aggregated measurements for flow-size estimation associated with VMs (e.g., 130, 132, 134, . . . ).

For example, with regard to various IP-table/flow-table/TCAM rules that potentially can be relevant in providing flow-aggregated measurements, the rule management component 316 can determine or identify certain IP-table/flow-table/TCAM rules from all of the various IP-table/flow-table/TCAM rules (e.g., can determine a compressed set (e.g., a subset) or reduced number of IP-table/flow-table/TCAM rules) that are usable to provide (e.g., determine) flow-aggregated measurements that facilitate determining estimations of flow sizes associated with virtual machines that can have a higher accuracy than other estimations of flow sizes of virtual machines that can be obtained from using the other rules of the various IP-table/flow-table/TCAM rules. The rule management component 316 can provide (e.g., present) the compressed or reduced set of IP-table/flow-table/TCAM rules to, for example, the network controller component 138, which can use such rules with SDN-enabled network devices (e.g., SDN-enabled switches and routers) associated with the communication network 112.

The following examples can illustrate differences between a regular IP assignment and the enhanced (e.g., intelligent) IP assignment of the disclosed subject matter as well as advantages of the enhanced IP assignment over the regular IP assignment. Consider a pool of private IP addresses for a project as 10.0.0.0/24, wherein it can be assumed that there are four flavor sizes, such as large, medium, small, and tiny associated with VMs. Also, consider two cases where in both cases there can be four VMs, wherein two VMs can have a large flavor size and two VMs can have a small flavor size, and each VM can be assigned with a unique IP. In these examples, and without loss of generality, there can be a concentration on the destination IP address when describing flow-aggregation feasibility.

For example, in the case of a regular IP address assignment strategy, without loss of generality, it can be assumed based on commonly used strategies, IP addresses 10.0.0.212 and 10.0.0.215 are assigned to VMs with a large flow-size and IP addresses 10.0.0.213 and 10.0.0.214 are assigned to VMs with a small flow-size. Now, the destination IP address part of aggregated flow-table entries, destined to small and large VMs, can be the same as 10.0.0.(110101XX), wherein "X" can denote a "don't-care" operator. Hence, incoming packets cannot be forwarded based on the longest priority match, wherein the longest priority match can be a typical or common classification mechanism employed in SDN-enabled devices, such as, for example, OpenFlow-enabled switches (e.g., switches enabled to use the OpenFlow protocol). This can be an example of a flow-aggregation feasibility constraint. Therefore, four flow-table entries typically can be used (e.g., required) for routing. In this case, although flow-size measurement can be relatively good (e.g., perfect or virtually perfect), this type of method is not desirably scalable in large-scale networks, as the number of flow-table/TCAM rules on SDN-enabled switches can be undesirably limited.

As further example, in the case of the enhanced IP address assignment strategy, without loss of generality, it can be assumed that the range of IP addresses 10.0.0.0/24 can be partitioned into the following subsets of IP addresses and assigned to different sub-groups of VMs (e.g., sub-group of VMs with a determined or defined tiny flow size, sub-group of VMs with a determined or defined small flow size, sub-group of VMs with a determined or defined medium flow size, and sub-group of VMs with a determined or defined large flow size), wherein, in this example, the subsets of IP addresses and associated VM sub-groups can comprise:

tiny={10.0.0.1, . . . , 10.0.0.127};
small={10.0.0.128, . . . , 10.0.0.191};
medium={10.0.0.192, . . . , 10.0.0.252}; and
large={10.0.0.253, 10.0.0.254}.

For instance, the assignment management component 136 (e.g., employing the partition component 302) can partition the set of IP addresses (e.g., range of available IP addresses) into respective subsets of IP addresses and can assign the respective subsets of IP addresses to respective sub-groups of VMs (e.g., tiny, small, medium, large), as presented above.

It is to be appreciated and understood that, in accordance with various embodiments of the disclosed subject matter, the assignment management component 136 can partition the available IP addresses into respective (e.g., different) subsets of IP addresses and assign the respective subsets of IP addresses to respective sub-groups of VMs in a variety of different ways. For instance, another option for partitioning the set of available IP addresses into respective subsets of IP addresses and assigning the respective (e.g., different) subsets of IP addresses to respective (e.g., different) sub-groups of VMs (e.g., by the assignment management component 136) can be large={10.0.0.1, 10.0.0.2}, medium={10.0.0.3, . . . , 10.0.0.64}, small={10.0.0.65, . . . , 10.0.0.127}, and tiny={10.0.0.128, 10.0.0.254}. It also is to be appreciated and understood that, in accordance with various aspects and embodiments of the disclosed subject matter, the number of sub-groups of VMs to which respective subsets of IP addresses can be assigned (e.g., by the assignment management component 136) can be four (as in the example) sub-groups of VMs, less than four sub-groups of VMs, or more than four sub-groups of VMs, based at least in part on the applicable defined assignment criteria.

In accordance with the example, it can be assumed that the assignment management component 136 (e.g., the partition component 302) assigned IP addresses 10.0.0.253 and 10.0.0.254 to VMs with an estimated large flow size, and assigned IP addresses 10.0.0.128 and 10.0.0.129 to VMs with an estimated small flow size. Based at least in part on such assignments of IP addresses, the assignment management component 136 can determine that the aggregated flow-table entries, which can be destined to VMs associated with a small flow size and VMs associated with a large flow size, respectively, can be 10.0.0.(1000000X) and 10.0.0.(111111XX), wherein "X" can denote a "don't-care" operator. The network controller component 138 can facilitate configuring network devices (e.g., SDN-enabled switches and routers) using the aggregated flow-table entries, and, using such aggregated flow-table entries, incoming data packets can be forwarded by the network devices (e.g., SDN-enabled switches and routers) without any flow aggregation feasibility constraint.

To illustrate the estimation accuracy and for explanation purposes, assume that flow sizes are normalized between 0-100 units where [0-25] units indicate a tiny flow-size, [26-50] units indicate a small flow-size, [51-75] units indicate a medium flow-size, and [76-100] units indicate a large flow-size. It is to be appreciated and understood that defining flow-size ranges is not necessary for implementing the enhanced IP address assignment techniques (e.g., by the assignment management component 136), as disclosed herein. In this example illustration, flow ranges are used merely to illustrate the accuracy that can be achieved by employing the enhanced IP address assignment techniques of the disclosed subject matter.

It also is to be appreciated and understood that, if these example ranges are utilized (e.g., required) in practice, the link-bandwidth (e.g., capacity) can be used as the maximum allowable flow-size and these ranges can be computed. For instance, flow sizes less than 1% of link capacity can be considered as tiny flows; and this procedure also can be extended to other flow-size ranges. It is noted that, to improve the flow-size estimation accuracy, the range of flow sizes for different groups can be modified (e.g., enhanced, improved, or optimized).

With further regard to this example, consider a worst-case scenario where flows destined to small flow-size VMs respectively have sizes 26 and 50, and flows destined to large flow-size VMs respectively have sizes 76 and 100. Therefore, counters associated with the above two aggregated flows can provide counts of 76 and 176, respectively. Accordingly, using a basic flow-estimation technique (e.g., calculating the average which can indicate the worst case), the flow sizes estimates can be $$\frac{76}{2} = 38$$

for small flows and $$\frac{176}{2} = 88$$

for large flows. Hence, as can be observed, there are only 12 units of error for estimating the flow sizes in the worst-case scenario.

While such error in estimating the flow sizes in the worst-case scenario can be acceptable, it is noted that the assignment management component 136, or another component of or associated with the system 100, employing the disclosed subject matter can improve flow-size estimation accuracy by, for example, using desirable (e.g., better or improved) estimation techniques (e.g., compressed sensing estimation techniques), enhancing (e.g., improving or optimizing) the range of flow sizes for different sub-groups of VMs, and/or introducing more flow-size sub-groups than in the above example (e.g., introducing five flow-size sub-groups (L=5), instead of four flow-size sub-groups (L=4)). That is, the flow-size estimation accuracy can be based at least in part on the estimation technique employed in the estimation, the range of flow sizes utilized for different groups, and/or the number of flow-size groups of VMs employed. Accordingly, by employing techniques for the enhanced assignment of IP addresses to VMs, the disclosed subject matter can achieve a desirable (e.g., an appropriate, suitable, or acceptable) trade-off between flow-size estimation accuracy and the number of required flow-table entries, which can be of significance under hard constraint of network measurement resources in large-scale networks (e.g., flow-table/TCAM entries in SDN switches).

Table 1 (below) summarizes the comparison between these two example cases (e.g., regular IP address assignment strategy as compared to the enhanced IP address assignment strategy of the disclosed subject matter). Note that, although, with regard to the regular IP address assignment, the flow-size measurement is relatively more accurate, it is not scalable in large-scale networks, and thus, may not be suitable in large-scale networks. However, with regard to the enhanced IP address assignment of the disclosed subject matter, the disclosed subject matter (e.g., employing the assignment management component 136 and enhanced IP address assignment techniques) can provide a desirable trade-off between the flow-size estimation accuracy and the number of utilized (e.g., required) flow-table/TCAM rules, which, even in this basic example, has been decreased by 50%, as compared to the regular IP address assignment strategy, and can provide an even better trade-off in other IP assignment situations.

TABLE 1

A comparison between two cases.

| | # of flow-table/ TCAM rules | Estimation Accuracy | Considerations |
|---|---|---|---|
| Regular IP address strategy | 4 | Can have 0 units of error | Not Scalable |
| Enhanced IP address strategy | 2 | Can have 12 units of error (in the worst-case scenario) | Scalable and Effective |

There can be a number of advantages that can be gained from employing the enhanced (e.g., intelligent) IP assignment techniques, based at least in part on an estimate of flow sizes using the defined parameters of VMs (e.g., 130, 132, 134, . . . ) in a cloud environment, in accordance with the various aspects and embodiments of the disclosed subject matter. For example, the enhanced IP assignment techniques of the disclosed subject matter can provide a desirably compressed (e.g., reduced) set of IP-table/flow-table/TCAM rules that can provide desirably informative (e.g., suitably informative, optimally informative, or the most informative) flow-aggregated measurements for flow-size estimation for VMs with desirably (e.g., suitably, optimally) high accuracy via the application of network inference techniques, as disclosed herein. For instance, the assignment management component 136 can comprise a rule management component 316 that can determine or facilitate determining the desirably compressed or reduced set of IP-table/flow-table/ TCAM rules that can provide the desirably informative flow-aggregated measurements for flow-size estimation for VMs with the desirably (e.g., suitably, optimally) high accuracy. This can be of significant importance in large-scale networks and under hard resource constraints of limited flow-table/TCAM sizes in SDN switches/routers. Note that, without loss of generality, the flow-table/TCAM rules, which can be obtained using the enhanced IP assignment techniques, can be provided (e.g., by the assignment management component 136 or network controller component 138) in a way that can be compatible with an underlying routing mechanism associated with the communication network 112.

Also, the enhanced IP assignment techniques of the disclosed subject matter can match (e.g., be compatible) or be employed with other IP assigning strategies, such as, for example, a least recently used IP in DHCP. In this example case, the least recently used IP from each group can be assigned to the VM that belongs to that group.

Still another advantage of the disclosed subject matter can be that the assignment management component 136 (or another component of the disclosed subject matter) can achieve desirable load balancing over IP addresses assigned to each sub-group by the assignment management component 136, which can reduce the load on each flow-table/ TCAM rule (e.g., particularly for heavy loaded VMs with, for example, large flavor sizes). The achieving of desirable load-balancing performance can be used (e.g., by the assignment management component 136 or other component) as criteria for determining (e.g., computing) the number of IP addresses for each sub-group of VMs (e.g., respective sub-groups of VMs having respective ranges of estimated flow sizes).

Yet another advantage of the disclosed subject matter can be that employing the assignment management component 136 and the enhanced IP address assignment technique to desirably assign IP addresses to VMs can make network management easier, and it also can reduce or mitigate the flow-aggregation feasibility constraint among different subnets from different sub-groups of private IP addresses.

As still another advantage of the disclosed subject matter, respective estimates of flow sizes of respective VMs can be known or determined (e.g., by another component (e.g., evaluator component, security component, . . . ) based at least in part on the respective assignments of IP addresses to the respective VMs by the assignment management component 136, wherein the respective IP addresses are associated with respective classes or sub-groups of VMs, wherein the respective classes or sub-groups are associated with respective flow-size ranges and respective names or indexes. This information regarding the respective estimates of flow sizes of respective VMs and the respective classes or names associated with the respective IP addresses, can result in network operation being desirably easier, faster, and/or more efficient, as compared to traditional network operations. For example, employing the techniques of the disclosed subject matter, the respective IP class or sub-group names associated with respective IP addresses can be used (e.g., by the evaluator component or security component, . . . ) for anticipating, predicting, estimating, or determining flow sizes that can be used for traffic engineering, load balancing, heavy hitter (e.g., heavy flows), and/or denial of service detection, as more fully described herein.

Another advantage of the disclosed subject matter can be that the enhanced IP address assignment techniques can be readily employed and can be implemented in a variety of desirable and different ways, without restricting any of traditional or potential applications in cloud computing environments. For example, the enhanced IP address assignment techniques can select or assign a least used IP address from a sub-group of IP addresses for or to a VM, wherein the employment of a least-used IP-address assignment strategy can be compatible with a DHCP strategy for assigning IP addresses.

Furthermore, in some implementations, without loss of generality, the disclosed subject matter (e.g., the techniques employed by the assignment management component 136 and/or other components of or associated with the system 100) can be extended to other fields in flow tables, such as, for example, MAC addresses in flow tables employed with SDN-enabled network devices, which can be yet another advantage of the disclosed subject matter.

In accordance with various aspects and embodiments of the disclosed subject matter, the parameter-based estimation of flow sizes of VMs determined and employed by the assignment management component 136 and estimator component 140 can be utilized by the assignment management component 136 or other components (e.g., evaluator component, security component, . . . ) to make a variety of desirable determinations and/or perform a variety of different tasks or functions that can enhance network operations and data communications in the communication network 112, as more fully described herein.

As disclosed, the estimator component 140 can apply the function g(X) to determine (e.g., compute) an estimate of the flow-size of a VM (e.g., the volume of the VM's traffic represented in bytes or packets) as a function of the flavor parameters of the VM and/or other parameters or characteristics of or associated with the VM (e.g., VM 130). The estimator component 140 can model and estimate the volume of traffic of a server or host based at least in part on (e.g., as a function of) the respective flow-size estimates of respective VMs associated with the server or host. Having such an estimate for all active VMs associated with (e.g., inside) a server/host at each time interval, the estimator component 140 can determine (e.g., calculate) an estimate of the volume of the traffic of the server over time as a combination (e.g., a linear combination) of the flow-size estimates of the VMs running by the server. Such an estimate can be determined and provided by the estimator component 140 based at least in part on a set of defined parameters or characteristics associated with VMs and without having to perform any direct network measurement of the flow sizes associated with the VMs. It can be desirable (e.g., useful, or important) to have desirably accurate flow-size estimates associated with VMs, without having to perform direct network measurement of the flow sizes associated with the VMs, as the direct measurement of flow sizes of VMs can be challenging and expensive in large-scale cloud networks and under hard resource constraint of measurement resources.

Figure 4:
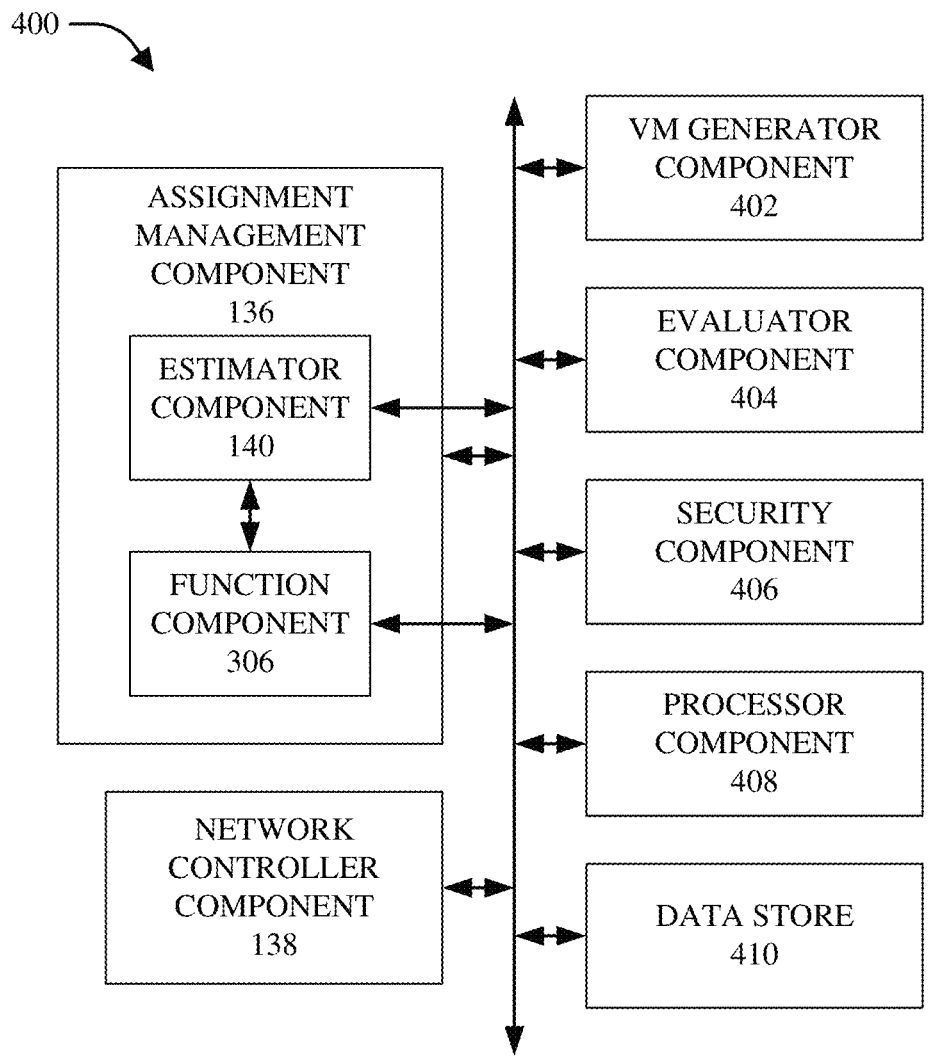
FIG. 4 depicts a block diagram of an example system that can facilitate determination of estimations of flow sizes associated with network nodes and use of the flow-size estimations to achieve various desired objectives in connection with networks, in accordance with various aspects and embodiments of the disclosed subject matter.

Further, the estimation of traffic volume(s) of a VM(s) that can be determined based at least in part on the defined parameters or characteristics of a VM(s) can be desirably (e.g., advantageously) used in a number of different applications. Referring to FIG. 4 (along with FIGS. 1 and 3), FIG. 4 depicts a block diagram of an example system 400 that can facilitate determination of estimations of flow sizes associated with network nodes and use (e.g., application) of the flow-size estimations to achieve various desired objectives in connection with networks, in accordance with various aspects and embodiments of the disclosed subject matter. In some embodiments, the system 400 can be part of or associated with the network component 110.

The system 400 can comprise the assignment management component 136, which can include the estimator component 140 and function component 306 (and other components), and the network controller component 138. The system 400 also can comprise a VM generator component 402, an evaluator component 404, a security component 406, a processor component 408, and a data store 410.

In some embodiments, the VM generator component 402 (e.g., VM generator and launcher component) can utilize the estimate of a flow size associated with a VM (e.g., VM 130), which can be determined by the estimator component 140 using function g(X), to determine a desirable (e.g., suitable, enhanced, best, or optimal) placement of the VM with a server or host of a number of servers or hosts. For instance, based at least in part on the estimate of the flow size of the VM, the VM generator component 402 can determine which server(s) or host(s) have sufficient resources to support the application(s) with which the VM is to be employed, and from such server(s) or host(s), determine which is the most desirable server or host to use for launching the VM.

In other embodiments, an evaluator component 404 (and/or the estimator component 140) can use and evaluate parameters of VMs and estimates of the flow sizes of VMs (e.g., determined based at least in part on respective parameters or characteristics associated with respective VMs) to determine and generate performance metrics (e.g., KPIs, such as latency and/or data packet loss), wherein the performance metrics, parameters of VMs, and/or estimates of flow sizes of VMs can be utilized to make determinations relating to traffic engineering and load-balancing for desirable (e.g., efficient, effective, enhanced, suitable, and/or optimal) network traffic management. For example, the evaluator component 404 (and/or the estimator component 140) can utilize respective flow-size estimates of respective VMs (e.g., 130, 132, 134, . . . ) and/or respective parameters of respective VMs to evaluate (e.g., pre-evaluate) the performance of traffic engineering and load-balancing associated with traffic being or to be communicated in the communication network 112.

As another example, the evaluator component 404 (and/or the estimator component 140) can utilize the respective flow-size estimates of the respective VMs (e.g., 130, 132, 134, . . . ) and/or respective parameters of the respective VMs to generate performance metrics, and can use such performance metrics to evaluate (e.g., pre-evaluate) or predict one or more of the performance indicators (e.g., KPIs) in advance, even prior to launching VMs (e.g., by the VM generator component 402). For instance, the evaluator component 404 (and/or the estimator component 140) can model, estimate, and/or predict performance metrics and performance indicators (e.g., KPIs) associated with VMs (e.g., 130, 132, 134, . . . ) in cloud networks based at least in part on (e.g., as a function of) the respective parameters or characteristics associated with the VMs. The evaluator component 404 (or another component(s) (e.g., the VM generator component 402 or the estimator component 140) associated with the system 400), can utilize such evaluated (e.g., pre-evaluated) performance metrics to facilitate enhanced placement of a VM with a desirable server or host (e.g., by the VM generator component 402), load balancing and traffic engineering for communication of traffic in the communication network 112, resource allocation and orchestration in cloud network environments, and/or make the applications more predictive and robust against future changes in dynamic operational networks.

In certain embodiments, the parameter (or characteristic)-based flow-size estimates, performance metrics, and/or performance indicators of VMs (e.g., determined by the estimator component 140) can be used to facilitate detecting security attacks or network anomalies associated with the communication network 112. For example, the security component 406 can evaluate the parameter (or characteristic)-based flow-size estimates of VMs (e.g., 130, 132, 134, . . . ) and can compare them to expected flow-size estimates of the VMs. The expected flow-size estimates of the VMs can be determined based at least in part on real flow-size measurements of the VMs or class-estimated flow-size estimates of the VMs that can be determined based at least in part on the respective classes to which the respective VMs belong.

With regard to a VM (e.g., VM 130), if the security component 406 determines that the comparison results of such comparison indicate that there is a significant (e.g., large) deviation between the estimated flow size associated with the VM (as determined using the function g(X)) and the expected flow-size estimate associated with the VM (e.g., VM 130) that satisfies (e.g., exceeds) a defined threshold amount of deviation, the security component 406 can determine that a security attack associated with the VM or a network anomaly associated with the VM or communication network 112 has occurred, can interpret such deviation as the presence of the security attack or the network anomaly, or can determine that such deviation can be an indication that the security attack or the network anomaly may have occurred, in accordance with defined security criteria. The security attacked can be determined to be, for example, a denial of service (DoS) attack or distributed DoS (DDoS) attack associated with the VM (e.g., VM 130). The network anomaly can be determined to be, for example, a failure(s) in network infrastructure of the communication network 112. The security component 406 also can distinguish between a security attack associated with the VM (e.g., VM 130) or a network anomaly associated with the VM or communication network 112, based at least in part on the amount of deviation and/or other information (e.g., other information that can provide an indication as to whether there has been a security attack or a network anomaly) obtained from another data source associated with the security component 406, in accordance with the defined network security criteria.

In some embodiments, the function component 306 can modify (e.g., adaptively modify) a function, such as function g(X) or function f over time, in an online and/or adaptive manner, in accordance with the defined assignment criteria. This can be performed in production environments (e.g., in real time or substantially real time) or a testing environment, as desired.

For example, the measurement component (e.g., measurement component 310) can measure real (e.g., actual) flow sizes associated with VMs (e.g., over a desired period(s) of time). The function component 306 (and/or the analyzer component 304) can analyze and/or compare the estimated flow sizes associated with VMs (e.g., 130, 132, 134, . . . ) and the real (e.g., measured) flow sizes associated the VMs that can relate to a defined period of time. The function component 306 can determine the amount of error between the estimated flow sizes associated with VMs and the real flow sizes associated the VMs associated with the defined period of time, based at least in part on the results of analyzing and/or comparing the estimated flow sizes and the real flow sizes associated the VMs with respect to the defined period of time. The function component 306 can determine (e.g., automatically, dynamically, or adaptively determine) a modification that can be made to the function (e.g., g(X) or f), based at least in part on the results of such analyzing and/or comparing, to generate a modified function that can reduce or minimize the amount of error between the estimated flow sizes and the real flow sizes associated the VMs (e.g., 130, 132, 134, . . . ). In some implementations, the function component 306 can facilitate determining and generating a modified function (e.g., a modified or adapted g(X)) by applying, for instance, a least mean square (LMS) algorithm or another desired algorithm that can reduce or minimize such error, and/or by measurement (e.g., by the measurement component 310) of a set of flow sizes of VMs at particular time intervals (based at least in part on the application) using a set of limited or reduced TCAM/flow-entries.

In certain embodiments, the assignment management component 136, employing the estimator component 140 and the function component 306, can enhance (e.g., improve) accuracy of estimation of flow sizes associated with VMs (e.g., 130, 132, 134, . . . ) based at least in part on (e.g., by applying) network inference techniques and related network inference problems. For example, the assignment management component 136, employing the estimator component 140 and the function component 306, can convert un-constrained network optimization and network inference problems (e.g., in cloud networks), into constrained optimization problems by incorporating supplementary information that can be determined (e.g., computed) using parameter-based flow-size estimates associated with VMs and/or parameter-based performance metric estimates associated with VMs.

In some implementations, the assignment management component 136 can incorporate flow-size estimates associated with VMs (e.g., 130, 132, 134, . . . ), which have been determined using the function g(X), into network inference problems to facilitate improving the flow-size estimation accuracy associated with VMs. For instance, consider a traffic matrix completion problem where matrix Z can represent the flow sizes of VMs (e.g., all VMs) to each other and a subset of the entries of the matrix Z can be directly measured; this subset of entries can be denoted by matrix B, where not-measured entries or missed entries can be set to zero. Given matrix B, the goal in matrix completion techniques can be to estimate the not-measured entries or missed entries of the matrix Z.

One approach that the assignment management component 136 can employ to estimate un-observed entries (e.g., not-measured or missed entries) of the matrix Z can be to decompose the matrix Z and re-write or modify the matrix Z to be $Z = LR^T$ and solve the following optimization problem of Equation (3) below, wherein A can be a binary matrix wherein its ones show measured entries of Z and its zeros show not-measured entries of Z. In this Equation (3), $\|.\|_F$ can be the Frobenius norm, T can be the transpose operator, and $\lambda$ can be a non-negative constant value. It is noted, without loss of generality, that it can be assumed that Z is an (n×n) matrix, wherein n can be virtually any desired positive number.

$$\hat{Z} = LR^T = \text{minimize}_{L,R} \|A(LR^T) - B\|_F^2 + \lambda(\|L\|_F^2 + \|R\|_F^2) \quad (3)$$

The assignment management component 136 can incorporate the estimates of flow sizes of VMs (e.g., determined using g(X) and based at least in part on respective defined parameters or characteristics associated with the respective VMs (e.g., 130, 132, 134, . . . )) into the traffic matrix completion problem in Equation (3) as constraints. Accordingly, based at least in part on such incorporation, Equation (3) can be modified to be Equation (4), wherein the flow-size estimates can be considered as constraints to the optimization problem of Equation (3). Consequently, employing Equation (4), the assignment management component 136 can improve the estimation accuracy of flow sizes associated with VMs due in part to the flow-size estimates being forced to be in constraint bounds, e.g., as specified in Equation (4), which can facilitate avoiding generating large and irrelevant errors relating to flow sizes associated with VMs.

For example, in Equation (4), $g_i(X_i)$ can be the flow-size estimate of the $i^{th}$ VM based at least in part on the parameters of such VM, which can be denoted by vector $X_i$, wherein i can be virtually any desired positive number. Also, $\alpha_i^1$ and $\alpha_i^2$ can be coefficients that can determine constraints bounds for the $i^{th}$ VM, and those coefficients (e.g., $\alpha_i^1$ and $\alpha_i^2$) can be desirably (e.g., appropriately, suitably) set to coefficient values (e.g., $\alpha_i^1 = 0.75$ and $\alpha_1^2 = 1.25$) or such coefficients can be estimated (e.g., by the assignment management component 136 or another component), for example, in a supervised learning approach and using a training data set (e.g., as quartile statistics). In Equation (4), $L_i$ and $R_j^T$ can denote the $i^{th}$ row of matrix L and $j^{th}$ column of matrix $R^T$. Also note that $g_i(X_i)$ for $i^{th}$ VM to itself can be zero. Equation (4) can be as follows:

$$\hat{Z} = LR^T = \text{minimize}_{LR} \|A(LR^T) - B\|_F^2 + \lambda(\|L\|_F^2 + \|R\|_F^2) \quad (4)$$

$$\text{subject to:} \begin{cases} \alpha_1^1 g_1(X_1) \le L_1 R_j^T \le \alpha_1^2 g_1(X_1) & \text{for } j = 2, \ldots, n \\ \alpha_2^1 g_2(X_2) \le L_2 R_j^T \le \alpha_2^2 g_2(X_2) & \text{for } j = 1, 3, \ldots, n \\ \vdots \\ \alpha_n^1 g_n(X_n) \le L_n R_j^T \le \alpha_n^2 g_n(X_n) & \text{for } j = 1, \ldots, n-1 \end{cases}$$

These constraints of Equation (4) can act as supplementary information for the matrix completion techniques (e.g., relating to the network inference techniques), and such constraints can significantly improve the estimation accuracy of flow-size estimations of VMs (e.g., 130, 132, 134, . . . ) of the matrix completion techniques, in accordance with the disclosed subject matter. It is noted that, in some implementations, such constraints of Equation (4) can be incorporated to other (e.g., different) optimization formulations for matrix completion to facilitate improving the estimation accuracy of flow-size estimations of VMs. Also, it should be noted that, such constraints in Equation (4) are merely one non-limiting illustrative way of representing the constraints for the optimization problem, and, in other embodiments, these constraints can be provided in different forms to facilitate improving the estimation accuracy of flow-size estimations of VMs.

Moreover, such constraints in Equation (4) can be adaptively revised (e.g., by the assignment management component 136) when the most recently determined (e.g., computed) functions g(X) s are used. For example, if the function component 306 determines the function g(X) is to be modified to a modified function (e.g., g'(X)), the assignment management component 136 (or another component) can adaptively revise the constraints of Equation (4) to account for any modifications to the function g(X), wherein such revisions to the constraints of Equation (4) can significantly improve the estimation accuracy of flow-size estimations of VMs.

As disclosed herein, other performance metrics (e.g., latency or packet loss) also can be modeled as a function of parameters associated with a VM(s). For example, the assignment management component 136 (e.g., employing the modeler component 312) can model the latency or packet loss between two VMs (e.g., VM 130 and VM 132) based at least in part on the function $g(X_1,X_2)$, wherein $X_1$ and $X_2$ can represent the parameters associated with $VM_1$ and $VM_2$, respectively, and wherein such parameters can comprise any of the various parameters (e.g., flavor size, number of vCPUs, and/or memory size, . . . ) disclosed herein. Accordingly, the assignment management component 136 can extend the optimization formulation in Equation (4) to estimate not-measured entries of a matrix of latencies or packet losses. In this example case, the entries of matrix Z can represent delays or packet losses from a VM (e.g., VM 130) to another VM (e.g., VM 132), and the incorporated constraints can enhance the estimation accuracy of inferring not-measured entries of the matrix.

The system 400 can comprise the processor component 408 that can work in conjunction with the other components (e.g., assignment management component 136, network controller component 138, VM generator component 402, evaluator component 404, security component 406, data store 418) to facilitate performing the various functions of the system 400. The processor component 408 can employ one or more processors, microprocessors, or controllers that can process data, such as information relating to determining estimated flow sizes associated with VMs (e.g., 130, 132, 134, . . . ), assigning network addresses, traffic management and distribution, load balancing of traffic, parameters or characteristics associated with VMs, traffic flows, policies, defined assignment criteria, defined security criteria, algorithms (e.g., defined assignment algorithm(s)), protocols, interfaces, tools, and/or other information, to facilitate operation of the system 400, as more fully disclosed herein, and control data flow between the system 400 and other components (e.g., communication devices, base stations, cells, devices of the communication network, data sources, applications, compute component, storage component, database component) associated with the system 400.

The data store 410 can store data structures (e.g., user data, metadata), code structure(s) (e.g., modules, objects, hashes, classes, procedures) or instructions, information relating to determining estimated flow sizes associated with VMs (e.g., 130, 132, 134, . . . ), assigning network addresses, traffic management and distribution, load balancing of traffic, parameters or characteristics associated with VMs, traffic flows, policies, defined assignment criteria, defined security criteria, algorithms (e.g., defined assignment algorithm(s)), protocols, interfaces, tools, and/or other information, to facilitate controlling operations associated with the system 400. In an aspect, the processor component 408 can be functionally coupled (e.g., through a memory bus) to the data store 410 in order to store and retrieve information desired to operate and/or confer functionality, at least in part, to the assignment management component 136, network controller component 138, VM generator component 402, evaluator component 404, security component 406, and data store 418, etc., and/or substantially any other operational aspects of the system 400.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 5:
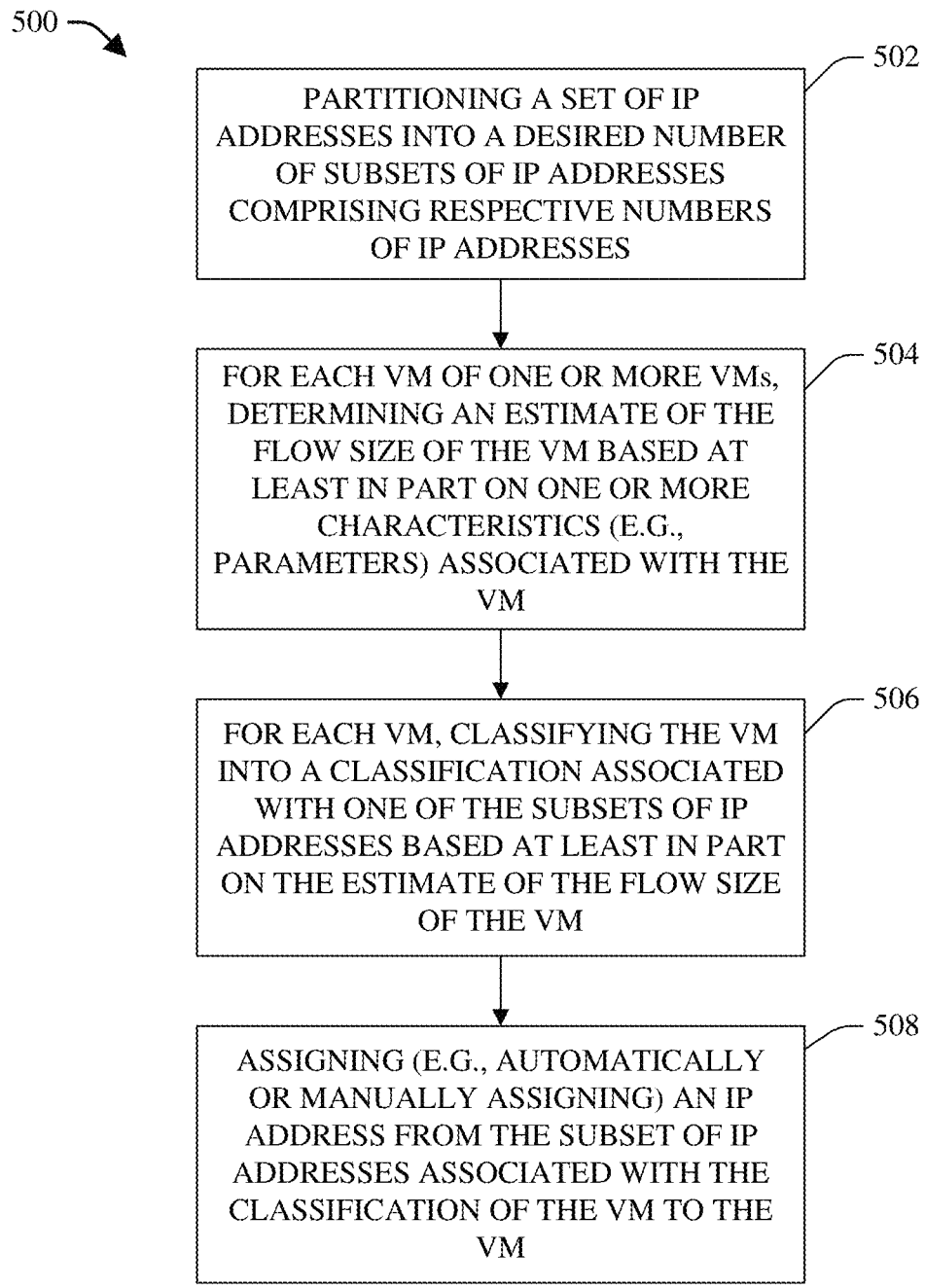
FIG. 5 presents a flow chart of an example method that can enhance Internet protocol (IP) address assignments and flow-size estimations or determinations associated with virtual machines in a network, in accordance with various aspects and embodiments of the disclosed subject matter.
Figure 6:
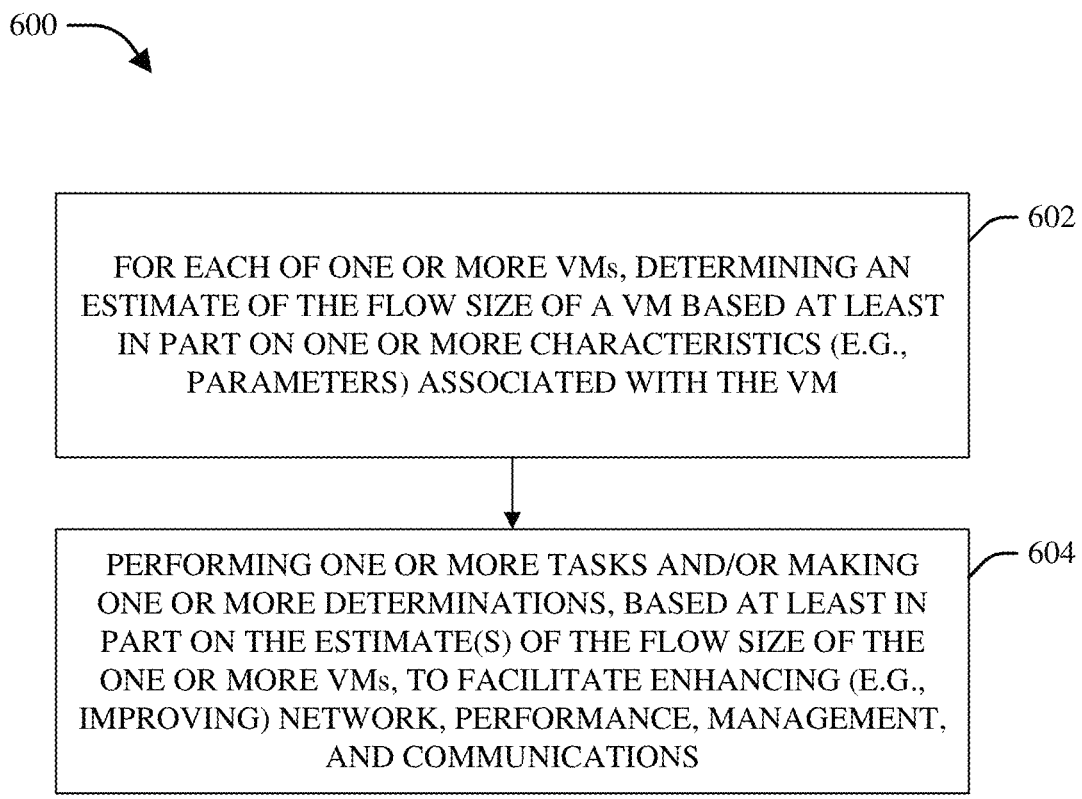
FIG. 6 depicts a flow chart of an example method that can enhance IP address assignments and flow-size estimations or determinations associated with virtual machines in a network to facilitate virtual machine placement, traffic management and load balancing, resource allocation, and/or orchestration in cloud networks, in accordance with various aspects and embodiments of the disclosed subject matter.

In view of the example systems and/or devices described herein, example methods that can be implemented in accordance with the disclosed subject matter can be further appreciated with reference to flowcharts in FIGS. 5-6. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 5 illustrates a flow chart of an example method 500 that can enhance IP address assignments and flow-size estimations or determinations associated with VMs in a network, in accordance with various aspects and embodiments of the disclosed subject matter. The method 500 can be employed by, for example, a cloud management component comprising an assignment management component and an estimator component.

At 502, a set of IP addresses can be partitioned into a desired number of subsets of IP addresses comprising respective numbers of IP addresses. The set of IP addresses can be associated with a project, for example. The assignment management component can partition the set of IP addresses into a desired number of subsets of IP addresses comprising respective numbers of IP addresses (e.g., respective numbers of consecutive IP addresses) based at least in part on the application(s) (e.g., characteristics or requirements of the application(s)) associated with the project and the defined assignment criteria (e.g., assignment criteria relating to the number of subsets of IP addresses to employ). For instance, the assignment management component can partition the set of IP addresses into four subsets of IP addresses, and can associate the four subsets of IP addresses with respective classifications, such as large (e.g., large flavor size or flow size), medium (e.g., medium flavor size or flow size), small (e.g., small flavor size or flow size), and tiny (e.g., tiny flavor size or flow size). The respective numbers of IP addresses of the subsets of IP addresses can be different from each other, or a number of IP addresses of one subset of IP addresses can be the same as another subset of IP addresses.

At 504, for each VM of one or more VMs, an estimate of the flow size of the VM can be determined based at least in part on one or more characteristics (e.g., parameters) associated with the VM. For each VM, the estimator component can employ (e.g., apply) a function $f$ to determine (e.g., calculate) an estimate of the flow size of the VM based at least in part on the one or more characteristics associated with the VM. The one or more characteristics associated with the VM can comprise, for example, flavor size of the VM, number of vCPUs associated with the VM, memory size of the VM, ephemeral disk space of VM, RXTX factor of the VM, swap space of the VM, the amount of volume storage and/or block storage associated with (e.g., attached to) the VM, hardware characteristics of the server that runs the VM (e.g., the speed and/or type of the physical NIC card), and/or other characteristics. The type and/or characteristics of hypervisors and the application(s) associated with the VM also can be directly considered as characteristics of the function $f$, or the function can be determined (e.g., computed) per hypervisor and/or application (e.g., by the assignment management component or another component).

At 506, for each VM, the VM can be classified into a classification associated with one of the subsets of IP addresses based at least in part on the estimate of the flow size of the VM. With respect to each VM, the assignment management component (e.g., employing the estimator component) can apply the function $f$ to classify the VM into one of the classifications associated with one of the subsets of IP addresses based at least in part on the estimate of the flow size of the VM. That is, applying the function $f$ to the characteristics associated with the VM can produce (e.g., determine) an estimate of the flow size of the VM, and determine the name or index (e.g., classification) of the subset (e.g., group) to which the VM belongs based at least in part on the estimate of the flow size and a set of threshold values relating to flow sizes and the classifications, wherein the set of threshold values can be part of the function $f$ The names or indexes can comprise, for example, large, medium, small, and/or tiny. The assignment management component can classify the VM to one of those names or indexes based at least in part on the results of comparing of evaluating the estimate of the flow size of the VM with respect to the threshold values of the function $f$ The assignment management component can assign the VM to the subset of IP addresses associated with that name or index to which the VM is classified.

At 508, an IP address from the subset of IP addresses associated with the classification of the VM can be assigned (e.g., automatically or manually assigned) to the VM. The assignment management component can assign (e.g., automatically or manually assign) an IP address from the subset of IP addresses associated with the classification of the VM to the VM, in accordance with the defined assignment criteria and/or an assignment procedure. The assignment procedure can be, for example, the first available IP address of that subset of IP addresses, the least used IP address of that subset of IP addresses, or another desired assignment procedure, which can be specified by the defined assignment criteria.

The method 500 can continue to be performed (e.g., by the assignment management component), for example, until all the VMs have been classified and had IP addresses assigned to them.

FIG. 6 presents a flow chart of an example method 600 that can enhance IP address assignments and flow-size estimations or determinations associated with VMs in a network to facilitate VM placement, traffic management and load balancing, resource allocation, and/or orchestration in cloud networks, in accordance with various aspects and embodiments of the disclosed subject matter. The method 600 can be employed by, for example, a cloud management component comprising an assignment management component, an estimator component, VM generator component, evaluator component, and/or security component.

At 602, for each of one or more VMs, an estimate of the flow size of a VM can be determined based at least in part on one or more characteristics (e.g., parameters) associated with the VM. For each VM, the estimator component can employ (e.g., apply) a function $g(X)$ to determine (e.g., calculate) an estimate of the flow size of the VM based at least in part on the one or more characteristics (e.g., flavor size of the VM, number of vCPUs associated with the VM, memory size of the VM, . . . ) associated with the VM, as more fully described herein.

At 604, one or more tasks can be performed and/or one or more determinations can be made, based at least in part on the estimate(s) of the flow size of the one or more VMs, to facilitate enhancing (e.g., improving) network, performance, management, and communications. The estimation of a flow size of a VM can be used in a variety of different applications. For example, the VM generator component can determine a desirable (e.g., enhanced, suitable, acceptable, or optimal) placement of the VM with respect to a server or host (e.g., determine the best server or host for launching the VM, wherein such server or host has sufficient resources to support the application(s) associated with the VM). As another example, the evaluator component can analyze the estimate(s) of flow size of one or more VMs, and/or other network-related information, and, based at least in part on the results of the analysis, the evaluator component can make one or more determinations regarding traffic engineering or load balancing for effective network traffic management to achieve desirable (e.g., fast, efficient) communication of traffic in the communication network.

As still another example, the evaluator component can determine and evaluate (e.g., pre-evaluate) the performance of traffic engineering and load balancing for a communication network, and/or predict one or more performance indicators (e.g., KPIs) associated with a VM(s) in advance, based at least in part on the results of analysis of the respective estimates of flow sizes of respective VMs and/or other network-related information, even before launching the VMs. The evaluator component also can utilize such performance metrics (e.g., pre-evaluated performance metrics) to make determinations or decisions, and/or perform tasks, regarding VM placement, resource allocation and orchestration in cloud networks. This can make these applications more predictive and robust against future changes in dynamic operational networks.

As yet another example, the security component can determine or detect a security attack or network anomaly based at least in part on the results of analyzing the estimate(s) of flow size of one or more VMs. For instance, with regard to one or more VMs, if the security component determines that there is a significant (e.g., large) deviation from flow-size estimates, the security component can determine that such significant deviation represents (e.g., can interpret such significant deviation as) the presence of an attack (e.g., DoS attack or DDoS attack) or a network anomaly (e.g., due to failures in network infrastructure).

Figure 7:
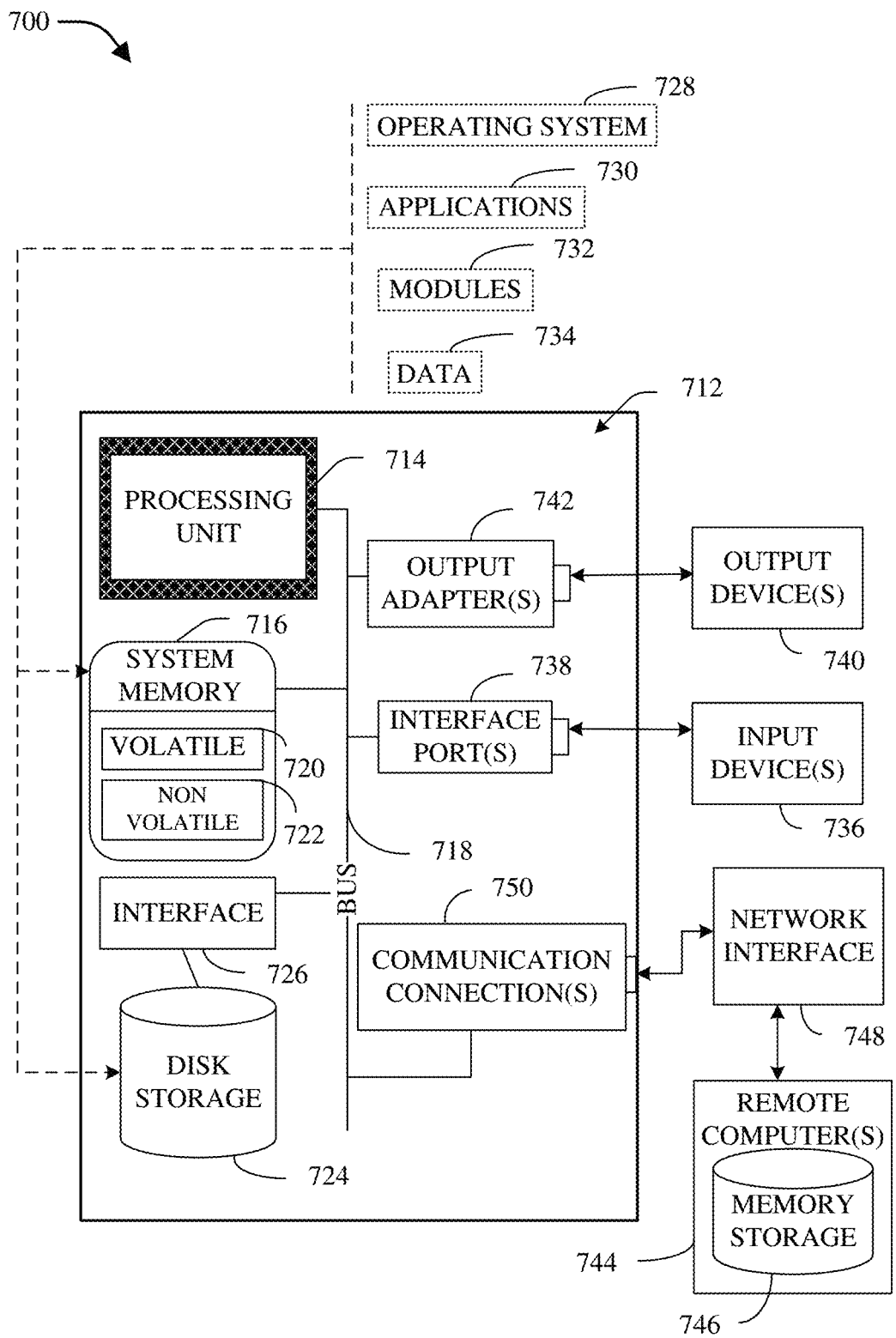
FIG. 7 is a schematic block diagram illustrating a suitable operating environment.
Figure 8:
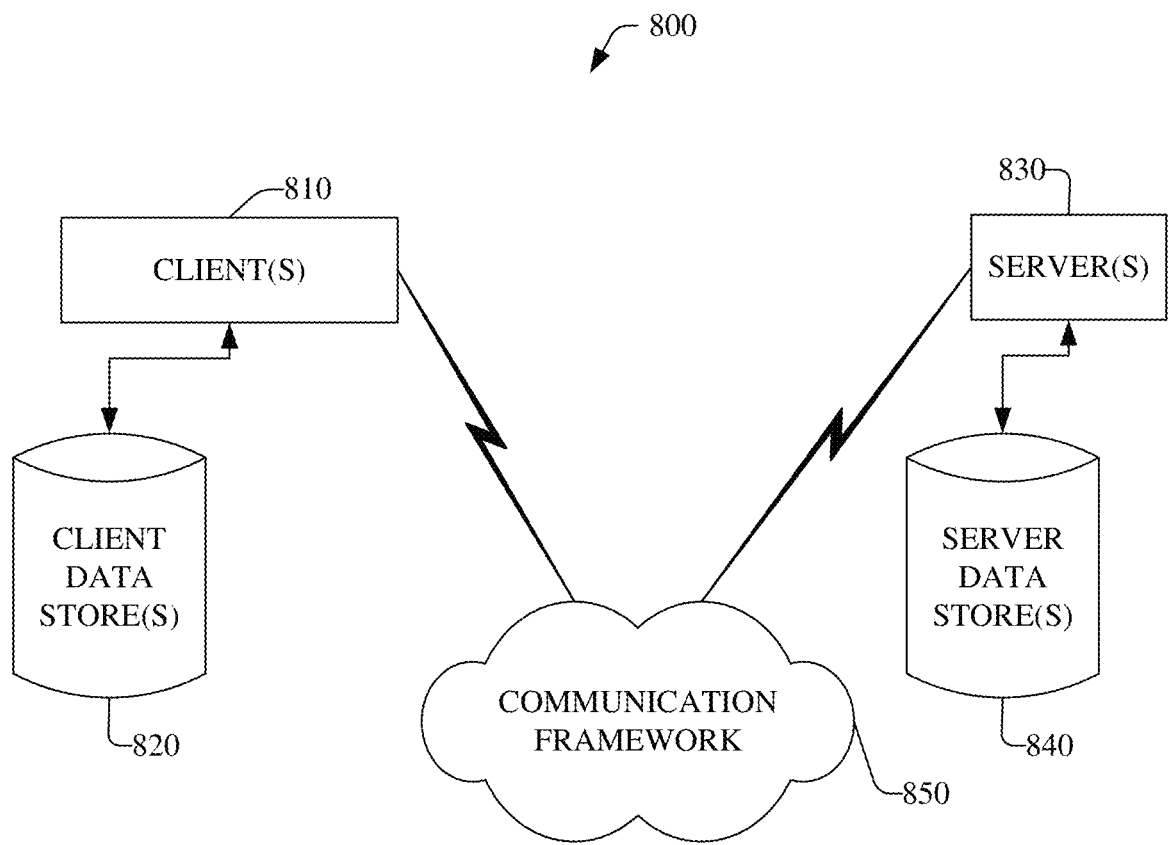
FIG. 8 is a schematic block diagram of a sample-computing environment.

In order to provide a context for the various aspects of the disclosed subject matter, FIGS. 7 and 8 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 7, a suitable environment 700 for implementing various aspects of this disclosure includes a computer 712. The computer 712 includes a processing unit 714, a system memory 716, and a system bus 718. It is to be appreciated that the computer 712 can be used in connection with implementing one or more of the systems, components, or methods shown and described in connection with FIGS. 1-6, or otherwise described herein. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 720 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 712 also includes removable/non-removable, volatile/non-volatile computer storage media. FIG. 7 illustrates, for example, a disk storage 724. Disk storage 724 includes, but is not limited to, devices like a magnetic disk drive, floppy disk drive, tape drive, Jaz drive, Zip drive, LS-100 drive, flash memory card, or memory stick. The disk storage 724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used, such as interface 726.

FIG. 7 also depicts software that acts as an intermediary between users and the basic computer resources described in the suitable operating environment 700. Such software includes, for example, an operating system 728. Operating system 728, which can be stored on disk storage 724, acts to control and allocate resources of the computer system 712. System applications 730 take advantage of the management of resources by operating system 728 through program modules 732 and program data 734 stored, e.g., in system memory 716 or on disk storage 724. It is to be appreciated that this disclosure can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

FIG. 8 is a schematic block diagram of a sample-computing environment 800 (e.g., computing system) with which the subject matter of this disclosure can interact. The system 800 includes one or more client(s) 810. The client(s) 810 can be hardware and/or software (e.g., threads, processes, computing devices). The system 800 also includes one or more server(s) 830. Thus, system 800 can correspond to a two-tier client server model or a multi-tier model (e.g., client, middle tier server, data server), amongst other models. The server(s) 830 can also be hardware and/or software (e.g., threads, processes, computing devices). The servers 830 can house threads to perform transformations by employing this disclosure, for example. One possible communication between a client 810 and a server 830 may be in the form of a data packet transmitted between two or more computer processes.

The system 800 includes a communication framework 850 that can be employed to facilitate communications between the client(s) 810 and the server(s) 830. The client(s) 810 are operatively connected to one or more client data store(s) 820 that can be employed to store information local to the client(s) 810. Similarly, the server(s) 830 are operatively connected to one or more server data store(s) 840 that can be employed to store information local to the servers 830.

It is to be noted that aspects, features, and/or advantages of the disclosed subject matter can be exploited in substantially any wireless telecommunication or radio technology, e.g., Wi-Fi; Gi-Fi; Hi-Fi; Bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., virtual machine, network node, cloud management component, assignment management component, estimator component, network component, compute component, storage component, database component, network controller component, communication network, overlay/underlay network component, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   estimating, by a system comprising a processor, a flow size associated with a virtual machine based on a parameter associated with the virtual machine; and
   assigning, by the system, a network address of a group of network addresses associated with a classification to the virtual machine based on the flow size, wherein the flow size has been determined to be associated with the classification of respective classifications.

2. The method of claim 1, wherein the network address is an Internet protocol address or a media access control address.

3. The method of claim 1, wherein the estimating the flow size comprises estimating the flow size associated with the virtual machine based on at least one parameter selected from a group of parameters associated with the virtual machine, and wherein the group of parameters comprises a flavor size associated with the virtual machine, a number of virtual central processing units associated with the virtual machine, a memory size associated with the virtual machine, a disk space associated with the virtual machine, a receive and transmit factor associated with the virtual machine, a swap space associated with the virtual machine, a first amount of volume storage associated with the virtual machine, a second amount of block storage associated with the virtual machine, a first characteristic of a server associated with the virtual machine, a second characteristic of a hypervisor associated with the virtual machine, and a third characteristic of an application associated with the virtual machine.

4. The method of claim 1, further comprising:
   partitioning, by the system, network addresses into respective groups of network addresses, comprising the group of network addresses, based on respective characteristics associated with respective applications associated with respective virtual machines, comprising the virtual machine, wherein the respective groups of network addresses are associated with the respective classifications; and
   classifying, by the system, the virtual machine as being associated with the classification that is associated with the group of network addresses based on a result of comparing the flow size associated with the virtual machine to respective threshold flow sizes associated with the respective classifications.

5. The method of claim 1, wherein the group of network addresses comprises respective network addresses in a consecutive address order.

6. The method of claim 1, further comprising:
   determining, by the system, first data traffic processing rules that are usable to provide first flow-aggregated measurements that facilitate determining first estimations of flow sizes associated with respective virtual machines with a higher accuracy than a lower accuracy of second estimations of flow sizes associated with the respective virtual machines that are able to be obtained from second flow-aggregated measurements using second data traffic processing rules; and
   presenting, by the system, the first data traffic processing rules for use in enhancing accuracy in estimating further flow sizes associated with the respective virtual machines.

7. The method of claim 1, wherein a function is applied to respective parameters, comprising the parameter, to facilitate estimating respective flow sizes, comprising the flow size, associated with respective virtual machines, comprising the virtual machine, and wherein the method further comprises:
   analyzing, by the system, the respective flow sizes and respective actual flow sizes associated with the respective virtual machines;
   determining, by the system, an amount of an error between the respective flow sizes and the respective actual flow sizes; and
   adaptively modifying, by the system, the function to generate a modified function, based on the amount of the error, to mitigate the amount of the error.

8. The method of claim 1, further comprising:
   estimating, by the system, performance metrics associated with virtual machines, comprising the virtual machine, based on parameters, comprising the parameter, associated with the virtual machines; and
   determining, by the system, a placement of the virtual machine for a launching of the virtual machine by a server based on the flow size of the virtual machine, the performance metrics associated with the virtual machine, and resources of the server that are available to support an application associated with the virtual machine.

9. The method of claim 1, further comprising:
   detecting, by the system, a deviation from the flow size associated with the virtual machine during a defined time period;
   determining, by the system, whether an amount of the deviation satisfies a defined threshold amount of deviation; and
   in response to determining that the amount of deviation satisfies the defined threshold amount of deviation, determining, by the system, that a defined anomaly has occurred with respect a network associated with the virtual machine, wherein the defined anomaly is one from a group comprising an attack on the network and a network anomaly relating to a service failure associated with the network.

10. The method of claim 1, further comprising:
    evaluating, by the system, a performance of traffic engineering and load balancing associated with a network based on performance data relating to the traffic engineering and the load balancing, wherein the performance data comprise respective estimates of flow sizes, comprising the flow size, of respective virtual machines, comprising the virtual machine; and
    prior to launching the respective virtual machines in the network, predicting, by the system, a performance indicator associated with the virtual machine based on a result of the evaluating of the performance of the traffic engineering and the load balancing associated with the network.

11. The method of claim 1, further comprising:
estimating, by the system, performance metrics associated with virtual machines, comprising the virtual machine, based on parameters, comprising the parameter, associated with the virtual machines; and
converting, by the system, an unconstrained network optimization and network inference problem to a constrained network optimization and network inference problem based on the flow size of the virtual machine and the performance metrics associated with the virtual machine, wherein a result of solving the constrained network optimization and network inference problem facilitates enhancing accuracy of estimations of flows sizes and the performance metrics of the virtual machines.

12. A system, comprising:
a processor; and
a memory that stores executable instructions that, when executed by the processor, facilitate performance of operations, comprising:
predicting a flow size associated with a virtual machine based on a characteristic associated with the virtual machine; and
assigning a network address of a group of network addresses associated with a classification to the virtual machine based on the flow size, wherein the flow size is determined to be associated with the classification of respective classifications.

13. The system of claim 12, wherein the operations further comprise determining the flow size associated with the virtual machine based on the predicting of the flow size associated with the virtual machine.

14. The system of claim 12, wherein the group of network addresses is ordered according to a consecutive address order.

15. The system of claim 12, wherein the network address is an Internet protocol address or a media access control address.

16. The system of claim 12, wherein the operations further comprise selecting the characteristic from a group of characteristics comprising a flavor size, a number of virtual central processing units, a memory size, a disk space, a communication bandwidth factor, a swap space, a first amount of volume storage, a second amount of block storage, a first attribute of a server, a second attribute of a hypervisor, and a third attribute of an application, associated with the virtual machine.

17. The system of claim 12, wherein the operations comprise:
partitioning network addresses into respective groups of network addresses, comprising the group of network addresses, based on respective attributes associated with respective applications associated with respective virtual machines, comprising the virtual machine, wherein the respective groups of network addresses are associated with the respective classifications; and
determining that the virtual machine is associated with the classification that is associated with the group of network addresses based on a result of evaluating the flow size associated with the virtual machine and respective threshold flow sizes associated with the respective classifications.

18. The system of claim 12, wherein the operations further comprise:
determining first data traffic processing rules that are determined to be able to provide first flow-aggregated measurements that facilitate first estimations of flow sizes associated with respective virtual machines with a first accuracy that is higher than a second accuracy of second estimations of the flow sizes associated with the respective virtual machines that are able to be obtained from second flow-aggregated measurements using second data traffic processing rules; and
facilitating application of the first data traffic processing rules to facilitate enhanced accuracy in further estimations of the flow sizes associated with the virtual machines.

19. A machine-readable storage medium, comprising executable instructions that, when executed by a processor, facilitate performance of operations, comprising:
estimating a flow size associated with a virtual machine based on a characteristic associated with the virtual machine; and
determining a network address of a sub-group of network addresses associated with a classification that is to be assigned to the virtual machine based on the flow size, wherein the flow size is determined to be associated with the classification of respective classifications, wherein a group of network addresses comprises the sub-group of network addresses, and wherein the sub-group of network addresses comprises respective network addresses in a consecutive address order.

20. The machine-readable storage medium of claim 19, wherein the operations further comprise:
partitioning the group of network addresses into respective sub-groups of network addresses, comprising the sub-group of network addresses, based on respective attributes associated with respective applications associated with respective virtual machines, comprising the virtual machine, wherein the respective sub-groups of network addresses are associated with the respective classifications; and
determining that the virtual machine is associated with the classification that is associated with the sub-group of network addresses based on a result of comparing the flow size associated with the virtual machine to respective threshold flow sizes associated with the respective classifications.

* * * * *